(12) United States Patent
Ohishi

(10) Patent No.: US 10,037,175 B2
(45) Date of Patent: Jul. 31, 2018

(54) IMAGE PROCESSING APPARATUS, METHOD FOR REGISTRATION OF ELECTRONIC DATA INCLUDED IN PRINT REQUEST BASED ON CONFERENCE ASSOCIATION

(71) Applicant: Tsutomu Ohishi, Tokyo (JP)

(72) Inventor: Tsutomu Ohishi, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 7 days.

(21) Appl. No.: 15/285,806

(22) Filed: Oct. 5, 2016

(65) Prior Publication Data

US 2017/0102902 A1 Apr. 13, 2017

(30) Foreign Application Priority Data

Oct. 7, 2015 (JP) ................................ 2015-199485

(51) Int. Cl.
| | |
|---|---|
| *G06K 15/00* | (2006.01) |
| *G06F 3/12* | (2006.01) |
| *H04L 29/06* | (2006.01) |
| *H04L 29/08* | (2006.01) |

(52) U.S. Cl.
CPC ............ *G06F 3/1204* (2013.01); *G06F 3/126* (2013.01); *G06F 3/1238* (2013.01); *G06F 3/1285* (2013.01); *H04L 65/1073* (2013.01); *H04L 65/1089* (2013.01); *H04L 65/403* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2007/0216942 | A1 | 9/2007 | Mizuno | |
| 2010/0049579 | A1* | 2/2010 | Suzuki | ............ G06Q 10/06311 705/7.19 |
| 2013/0321850 | A1* | 12/2013 | Tsuji | ................. G06K 15/4095 358/1.14 |

(Continued)

FOREIGN PATENT DOCUMENTS

| | | |
|---|---|---|
| JP | 2007-249858 A | 9/2007 |
| JP | 2015-103131 A | 6/2015 |

*Primary Examiner* — Henok A Shiferaw
(74) *Attorney, Agent, or Firm* — Harness, Dickey & Pierce, P.L.C.

(57) ABSTRACT

An image processing apparatus executes a print process by a processor, in response to a print request from a terminal apparatus. The processor receives the print request including electronic data; executes the print process based on the electronic data included in the print request; and executes a registration process for associating the electronic data with information about a conference in which displaying the electronic data is shared among terminal apparatuses participating in the conference. In response to receiving the print request, the processor executes the print process if the print process based on the electronic data is to be executed, or the registration process for associating the electronic data included in the print request, with the information about the conference relating to a user being a request source of the print request, if the displaying the electronic data is to be shared.

18 Claims, 22 Drawing Sheets

(56) References Cited

U.S. PATENT DOCUMENTS

2013/0332513 A1* 12/2013 Honda .................... H04L 67/42
  709/203
2014/0214957 A1* 7/2014 Taniguchi ............. H04L 67/306
  709/204
2016/0253143 A1 9/2016 Koike

* cited by examiner

FIG.7

| CONFERENCE ID | CONFERENCE NAME | STARTING DATA AND TIME | PLACE | PARTICIPANT LIST |
|---|---|---|---|---|
| Meeting001 | CONFERENCE 001 | 201501301400 | CONFERENCE ROOM 001 | U01,U02,... |
| Meeting002 | CONFERENCE 002 | 201501311000 | CONFERENCE ROOM 002 | U11,U12,... |
| ... | ... | ... | ... | ... |

FIG.8

| PARTICIPANT ID | PARTICIPANT NAME | DEVICE ID |
|---|---|---|
| U01 | PARTICIPANT 01 | Pad001 |
| U02 | PARTICIPANT 02 | Mobile001 |
| U11 | PARTICIPANT 11 | Projector001 |
| ... | ... | ... |

FIG.9

| DEVICE ID | IP ADDRESS | DESTINATION | ... |
|---|---|---|---|
| Pad001 | 192.168.1.100 | http://pad001.meeting.... | ... |
| Mobile001 | 192.168.1.101 | http://mobile001.meeting.... | ... |
| Projector001 | 192.168.1.200 | http://proj001.meeting.... | ... |
| ... | | ... | ... |

FIG.10

| CONFERENCE MATERIAL ID | CONFERENCE ID | STORED PLACE | PARTICIPANT LIST | RECEPTION STATE | ... |
|---|---|---|---|---|---|
| Si001 | Meeting001 | ...meeting001.pdf | U01, U02 | Not yet Done | ... |
| Si002 | Meeting002 | ...meeting002.pdf | U11 | Done | ... |
| ... | | ... | ... | ... | ... |

FIG.15

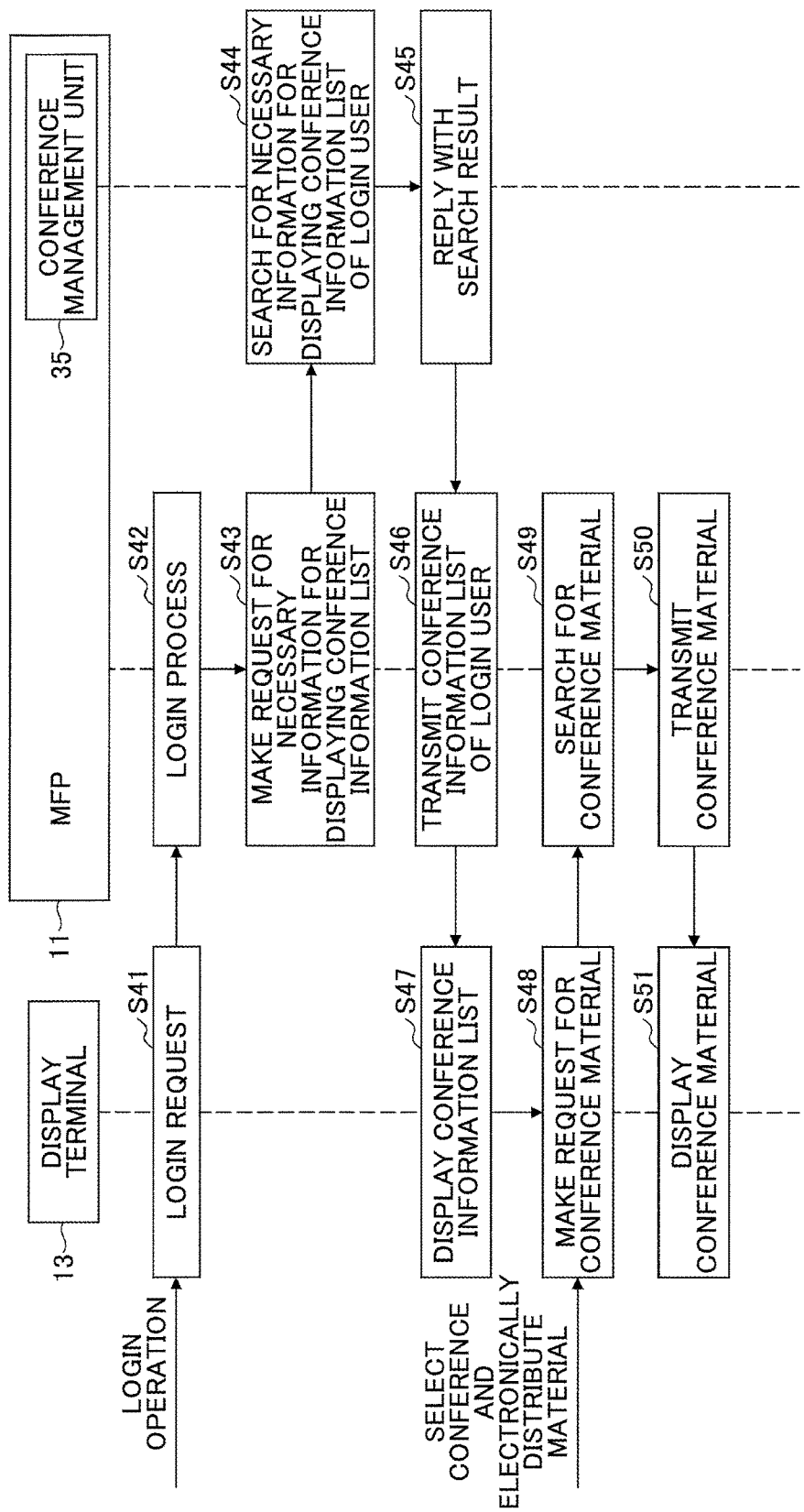

FIG.17

| | 1300a |
|---|---|
| ○○○ | CONFERENCE MANAGEMENT/CONFERENCE LIST |
| ⊗ KAI TARO | ○ YOU CAN SEARCH FOR CONFERENCES THAT SATISFY SPECIFIED CONDITIONS. |
| ⤓ LOGOUT 🔑 | SEARCH CONDITIONS |
| CONFERENCES TO BE HELD OR PARTICIPATED | CONFERENCE ID/CONFERENCE NAME [        ] |
| 📄 TODAY'S CONFERENCES | STARTING DATE AND TIME [        ] [PREVIOUS DAY][NEXT DAY] |
| CONFERENCE MANAGEMENT | CONFERENCE STATE ●ALL ○BEING HELD ○YET TO BE HELD ○NOT TO BE HELD |
| ⌕ CONFERENCE LIST | SEARCH RESULTS |
| ＋ REGISTER NEW CONFERENCE | |
| OTHERS | |
| ? HELP | |
| ⓘ ABOUT APPLICATION | |

Search Results (1302):

| | CONFERENCE ID | CONFERENCE NAME | STARTING DATE AND TIME | CONFERENCE STATE |
|---|---|---|---|---|
| ○ | 7706-150126 | NO AGENDA | 2015/01/26 10:00 | NOT TO BE HELD |
| ○ | 6492-150127 | KAWAKUBO AGENDA SPECIFIED | 2015/01/28 09:00 | NOT TO BE HELD |
| ○ | 0323-150127 | AGENDA SPECIFIED | 2015/01/28 09:45 | NOT TO BE HELD |
| ○ | 3647-150128 | AGENDA | 2015/01/28 15:45 | NOT TO BE HELD |
| ○ | 1045-150129 | TESTTEST | 2015/01/29 09:30 | NOT TO BE HELD |
| ○ | 5039-150129 | HEAVY AGENDA SPECIFIED | 2015/01/29 11:00 | NOT TO BE HELD |
| ○ | 4475-150126 | TESTESTEST | 2015/01/29 13:30 | NOT TO BE HELD |
| ○ | 5410-150129 | FOR AGENDA REFACTORING | 2015/01/29 17:00 | NOT TO BE HELD |
| ○ | 0114-150130 | PASSWORD | 2015/01/30 09:15 | NOT TO BE HELD |
| ○ | 3825-150202 | TKO | 2015/02/02 13:00 | YET TO BE HELD |

[CONFERENCE DETAILS]   ≪PREVIOUS 10 ITEMS   1~10/12   NEXT≫ 10 ITEMS

[DISTRIBUTE MATERIAL] (1306)   [PRINT MATERIAL] (1308)   [DELETE MATERIAL] (1310)

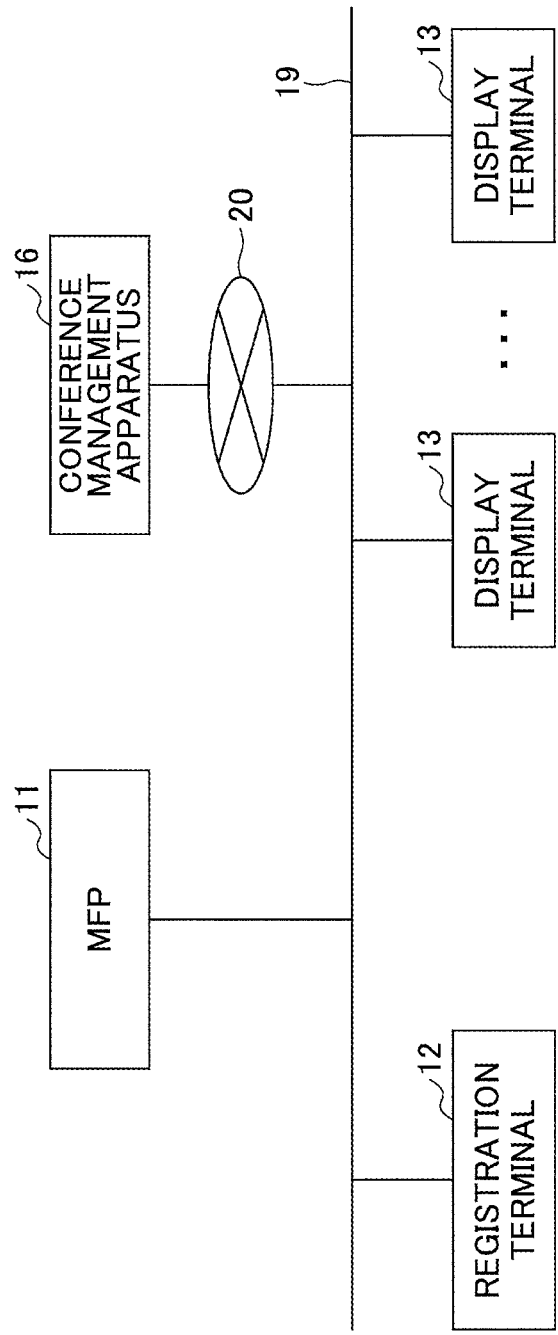

IMAGE PROCESSING APPARATUS, METHOD FOR REGISTRATION OF ELECTRONIC DATA INCLUDED IN PRINT REQUEST BASED ON CONFERENCE ASSOCIATION

BACKGROUND OF THE INVENTION

1. Field of the Invention

The present disclosure relates to an image processing apparatus, a method for registration, and an information processing system.

2. Description of the Related Art

In conferences in recent years, an increasing number of participants read materials used in a conference and the like, by displaying the materials on mobile terminals such as note PCs and tablet terminals, instead of, for example, by printing the materials as done conventionally. A participant of such a conference obtains electronic data of a material from a server apparatus or the like in which the electronic data of the material has been registered, and has a mobile terminal display the material, to attend the conference.

There has been a sharing system of a display screen used for a conventional conference, for example, in which a participating terminal obtains a material from a server apparatus, and the display screen is shared for referring to the material. In such a sharing system of a display screen used for a conventional conference, for example, before sharing the display screen for referring to the material, an organizer or a presenter of the conference has registered the material on a server apparatus in advance from a registration terminal (see, for example, Patent Document 1).

In the sharing system of a display screen used for a conventional conference, an organizer or a presenter of the conference operates the registration terminal to access a registration screen for a conference on the server apparatus, and to register the material on the server apparatus from the registration screen for the conference. In this way, by using the sharing system of a display screen, users do not need to print the material. On the other hand, cases still remain in which a user needs to print the material by using a print system separate from the sharing system of a display screen, depending on an environment of the user. Therefore, such a user needs to perform a registration operation of the material via the registration screen for the conference, and to separately perform a print operation of the material via a print screen, depending on the environment of the user. However, it is not always easy for the user to perform steps of printing the material, and to separately perform steps of registering the material on the server apparatus via the registration screen for the conference.

Note that such a problem is not limited to an application of the sharing system of a display screen in a conference, but similarly exists for an application of the system used for presentation and education, in which electronic data, such as image data and document data, needs to be obtained and installed on a terminal apparatus of a participant, such as a mobile terminal.

SUMMARY OF THE INVENTION

According to an embodiment, an image processing apparatus that executes a print process in response to a print request received from a terminal apparatus, includes a storage storing a computer-readable code; and one or more processors configured to execute the computer-readable code so as to receive the print request that includes electronic data from the terminal apparatus, to execute the print process based on the electronic data included in the print request, and to execute a registration process for associating the electronic data with information about a conference in which displaying the electronic data is shared among a plurality of terminal apparatuses participating in the conference. In response to the received print request, the processor executes the print process, if printing based on the electronic data is to be executed, or executes the registration process for associating the electronic data included in the print request, with the information about the conference relating to a user being a request source of the print request, if the displaying the electronic data is to be shared.

BRIEF DESCRIPTION OF DRAWINGS

FIG. 7 is a configuration diagram of an example of conference information;

FIG. 8 is a configuration diagram of an example of participant information;

FIG. 9 is a configuration diagram of an example of device information;

FIG. 10 is a configuration diagram of an example of conference material information;

FIG. 15 is a schematic view of an example of a conference information list screen of a login user;

FIG. 16 is a flowchart of an example of an electronic distribution process of a conference material;

FIG. 17 is a schematic view of another example of a conference information list screen of a login user;

FIG. 25 is a configuration diagram of an example of a conference system according to a third embodiment.

DETAILED DESCRIPTION OF THE EMBODIMENTS

In the following, embodiments will be described in detail with reference to the drawings. According to an embodiment, it is possible to make it easy for a user to perform printing a material, and to separately perform registering in advance the material for sharing a display screen, even if the environment requires the user doing so. Note that in the following embodiment, a conference system 1 will be described as an example of an information processing system.

First Embodiment

<System Configuration>

Figure 1:
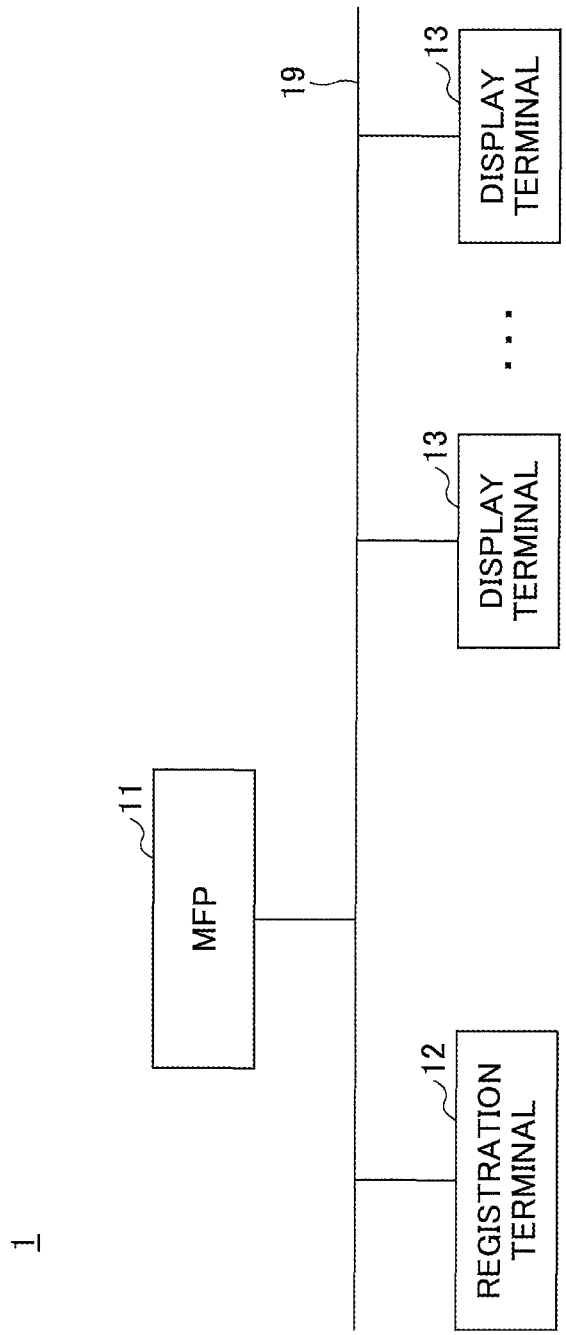
FIG. 1 is a configuration diagram of an example of a conference system according to a first embodiment.

FIG. 1 is a configuration diagram of an example of the conference system 1 according to a first embodiment. FIG. 1 illustrates an example of the configuration of the conference system 1 that includes a multifunction peripheral (MFP) 11, a registration terminal 12, and one or more display terminals 13, which are connected with a network 19 such as a LAN.

The MFP 11 is an example of an image processing apparatus. The image processing apparatus just needs to be an electronic device that has a print function, such as a printer and a multifunction peripheral. The MFP 11 has a conference management function other than the print function. The MFP 11 receives a request for generating a conference session, and stores information about the conference and the like, which will be described later. The MFP 11 also stores electronic data of conference materials to be registered (referred to as "the material data", below) as will be described later. The material data includes not only electronic document files, but also image files.

Further, the MFP 11 executes control for holding and/or participating in the conference. The MFP 11 provides the conference information and the conference material information to the display terminals 13. The MFP 11 distributes the material data of the conference in which participants participate, to the display terminal 13.

The registration terminal 12 is a terminal apparatus operated by a registered person such as an organizer or a presenter of the conference, for registering the material data. In response to receiving a print command of the material data from a registered person, the registration terminal 12 transmits a print job generated from the material data to the MFP 11, and stores the print job in the MFP 11. The registration terminal 12 is a terminal apparatus such as a mobile terminal including a PC, a tablet terminal, a smart phone, a cellular phone, and a PDA, a wearable terminal, and an electronic white board.

A conference application is activated on the display terminal 13. The display terminal 13 includes functions to obtain the conference information and the conference material information from the MFP 11, to download the material data, and to participate in a conference. A participant of a conference can participate in the conference from the display terminal 13. Note that the display terminal 13 may be a mobile terminal such as a PC, a tablet terminal, a smart phone, a cellular phone, and a PDA, or an electronic device such as a wearable terminal, an electronic white board, a projector, and a video conference device.

For example, the material data is displayed on the display terminal 13 while participating in the conference, which is the same data displayed on the other display terminals 13 participating in the same conference. Also, while participating in the conference, the display terminal 13 receives information about an input operation performed on another display terminal 13 by a presenter or the like (page turning, designation by a pointer, input of a hand-written stroke, etc.) from the MFP 11 in real time. Based on the received information about the input operation, the display terminal 13 reflects the same input operation on the material data displayed on the terminal itself in the same way as performed on the other display terminal 13, and hence, can share the screen with the other display terminals 13. The information about an input operation includes, for example, the page number of the material data, and coordinates information of a pointer and a hand-written stroke input operation.

In the conference system 1, the MFP 11, the registration terminal 12, and the display terminals 13 can execute data communication via the network 19. The network 19 may be a LAN, or any other network such as the Internet and a dedicated line, which may be wired or wireless. Note that although the registration terminal 12 and the display terminals 13 in FIG. 1 are separate for the sake of illustration, they are not necessarily separated if a mobile terminal or an electronic device is used that has both functions of the registration terminal 12, and functions of the display terminal 13.

<Hardware Configuration>

Figure 2:
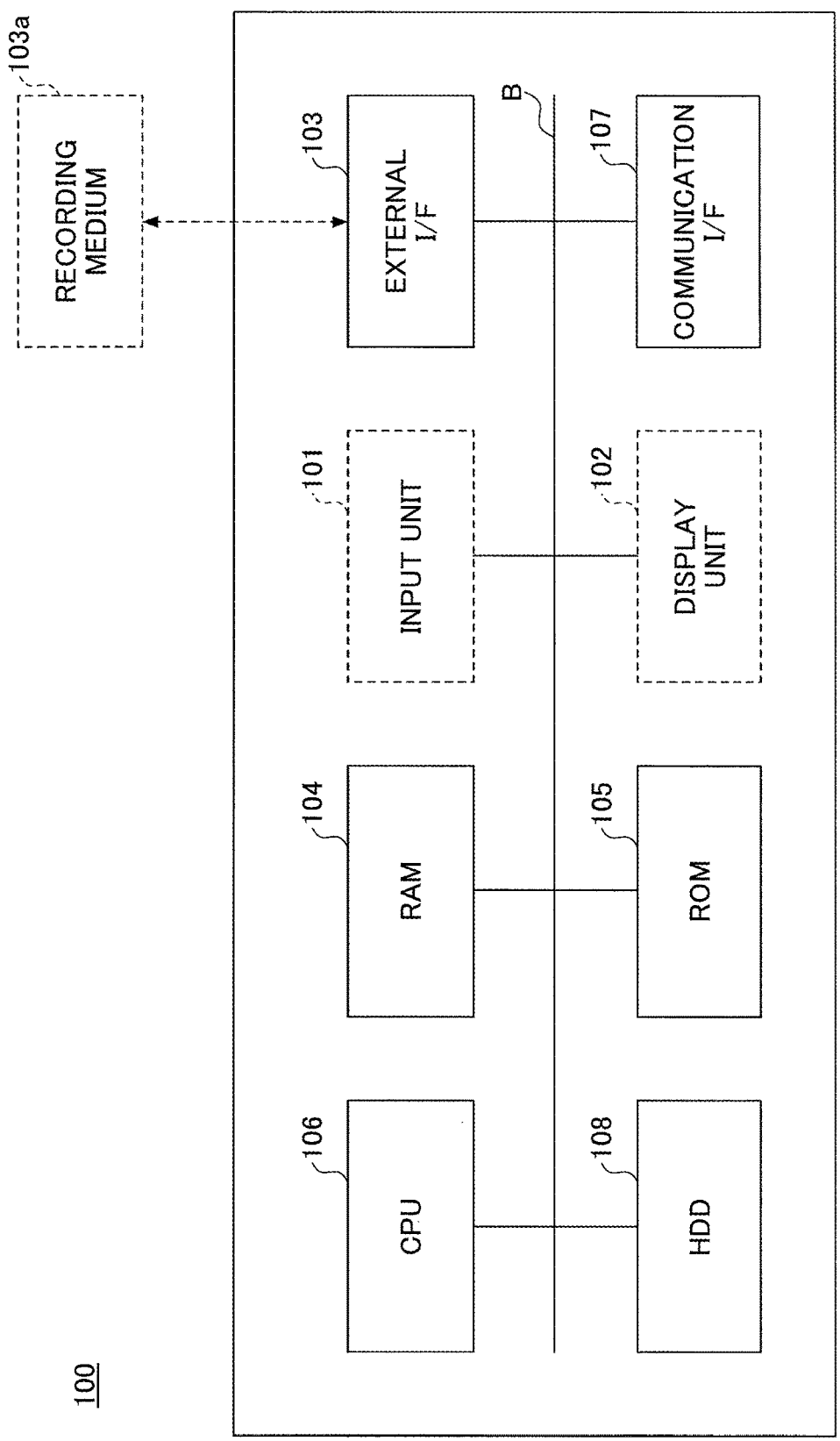
FIG. 2 is a hardware configuration diagram of an example of a computer according to the embodiment.

The registration terminal 12 and the display terminal 13 are implemented by a computer having a hardware configuration, for example, illustrated in FIG. 2. FIG. 2 is a hardware configuration diagram of an example of a computer 100 according to the embodiment.

The computer 100 illustrated in FIG. 2 includes an input unit 101, a display unit 102, an external I/F 103, a RAM 104, a ROM 105, a CPU 106, a communication I/F 107, and an HDD 108, which are mutually connected by a bus B. Note that the input unit 101 and the display unit 102 may be configured to be connected on demand.

The input unit 101 includes a keyboard, a mouse, and a touch panel that are used by the user to input operational signals. The display unit 102 includes a display to display a processed result by the computer 100.

The communication I/F 107 is an interface to have the computer 100 connected with various networks. Thus, the computer 100 can execute data communication via the communication I/F 107.

Also, the HDD 108 is an example of a non-volatile storage device to store programs and data. The stored programs and data include an OS (Operating System) that is basic software to control the computer 100 as a whole, and application software that provides various functions on the OS. Note that the computer 100 may use a drive unit that uses a flash memory as a recording medium (for example, an SSD (Solid State Drive)), instead of the HDD 108.

The external I/F 103 is an interface with an external device. The external device includes a recording medium 103a. Thus, the computer 100 can execute reads and/or writes on the recording medium 103a via the external I/F 103. The recording medium 103a may be a flexible disk, a CD, a DVD, an SD memory card, or a USB memory.

The ROM 105 is an example of a non-volatile semiconductor memory (a storage device) that can hold programs and data even when the power is turned off. The ROM 105 stores a BIOS (Basic Input/Output System) that is executed when activating the computer 100, and programs and data for OS settings and network settings. The RAM 104 is an example of a volatile semiconductor memory (a storage device) to store programs and data temporarily.

The CPU 106 is a processor that implements control and functions of the computer 100 as a whole, by reading the programs and data into the RAM 104 from the storage device such as the ROM 105 and the HDD 108, and executing processes. By executing a program, for example, on the computer 100 having the hardware configuration described above, the registration terminal 12 and the display terminal 13 can implement various processes as will be described later.

Figure 3:
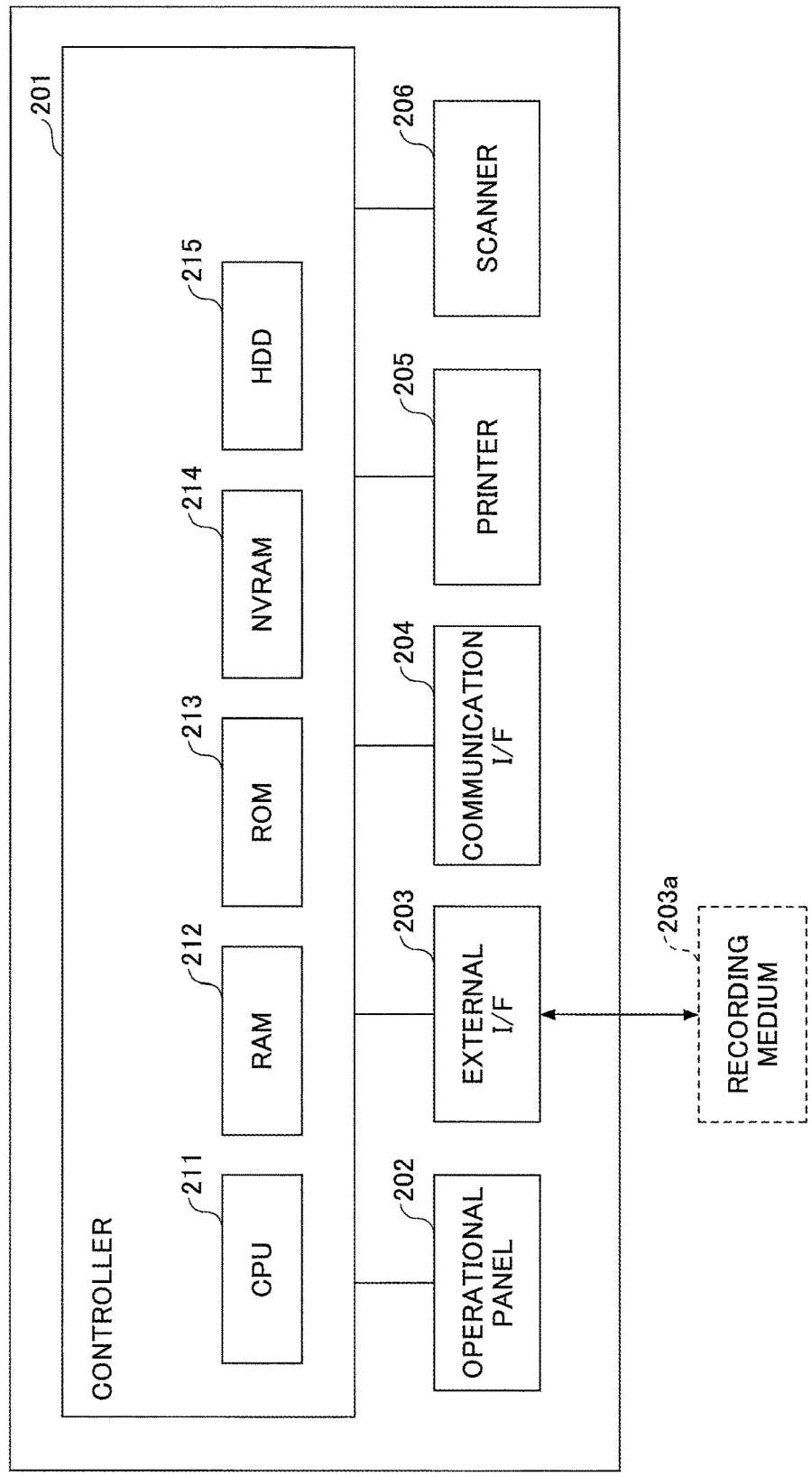
FIG. 3 is a hardware configuration diagram of an example of a multifunction peripheral according to the embodiment.

The MFP 11 in FIG. 1 is implemented by a computer having a hardware configuration, for example, as illustrated in FIG. 3. FIG. 3 is a hardware configuration diagram of an example of the MFP 11 according to the embodiment. The MFP 11 illustrated in FIG. 3 includes a controller 201, an operational panel 202, an external I/F 203, a communication I/F 204, a printer 205, and a scanner 206.

The controller 201 includes a CPU 211, a RAM 212, a ROM 213, an NVRAM 214, and an HDD 215. The ROM 213 stores various programs and data. The RAM 212 temporarily stores various programs and data. The NVRAM 214 stores, for example, setting information. Also, the HDD 215 stores various programs and data.

The CPU 211 implements control and functions of the MFP 11 as a whole, by reading the programs and data into the RAM 212 from the ROM 213, the NVRAM 214, and the HDD 215, and executing processes.

The operational panel 202 includes an input unit to receive input from the user, and a display unit for displaying. The external I/F 203 is an interface with an external device. The external device includes a recording medium 203a. Thus, the MFP 11 can execute reads and/or writes on the recording medium 203a via the external I/F 203. The recording medium 203a may be a flexible disk, a CD, a DVD, an SD memory card, or a USB memory.

Also, the communication I/F 204 is an interface to have the MFP 11 connected with the network 19. Thus, the MFP 11 can execute data communication via the communication I/F 204. The printer 205 is a printer apparatus to print data on an object to be conveyed. The object to be conveyed includes, for example, paper, coated paper, cardboard, OHP paper, plastic film, prepreg, and copper foil, not limited to paper. The scanner 206 is a reading device to read image data (electronic data) from a document.

<Software Configuration>

The MFP 11, the registration terminal 12, and the display terminal 13 of the conference system 1 according to the embodiment are implemented by, for example, the following functional blocks.

<<Registration Terminal>>

Figure 4:
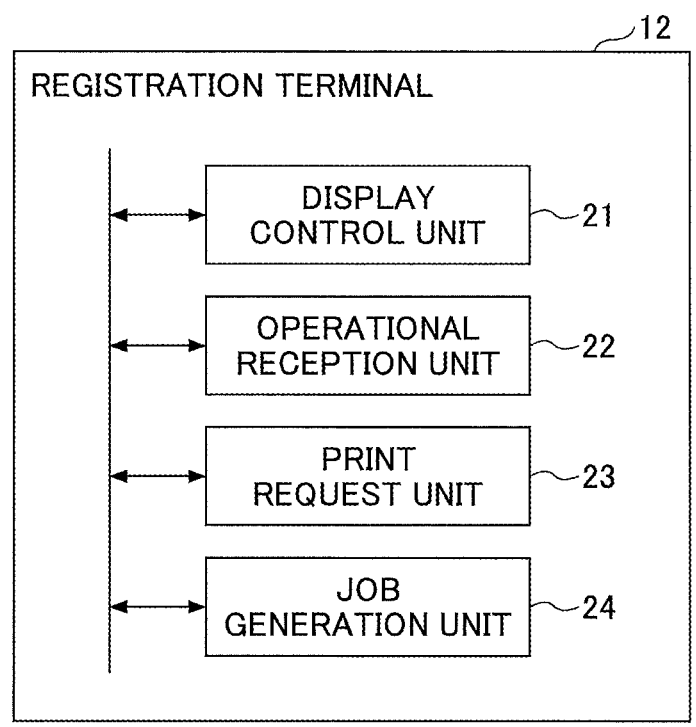
FIG. 4 is a functional block diagram of an example of a registration terminal.

The registration terminal 12 is implemented by functional blocks, for example, as illustrated in FIG. 4. FIG. 4 is a functional block diagram of an example of the registration terminal 12. By executing a program, the registration terminal 12 implements a display control unit 21, an operational reception unit 22, a print request unit 23, and a job generation unit 24.

The display control unit 21 controls various screens displayed on the display unit 102. The operational reception unit 22 receives a user operation on the input unit 101. Based on the user operation performed on the input unit 101, the print request unit 23 receives a print command from the user. For example, a registered person such as an organizer and a presenter of a conference issues a print command of material data, by using a print function of an application installed on the registration terminal 12. Then, the print request unit 23 transmits a print job of the material data of which the print command has been received from the user, to the MFP 11, to issue a request for printing. The job generation unit 24 generates a print job in response to receiving the print command from the user.

In this way, the registered person can issue a print command of the material data from the registration terminal 12, to transmit the print job of the material data to the MFP 11.

<<Multifunction Peripheral>>

Figure 5:
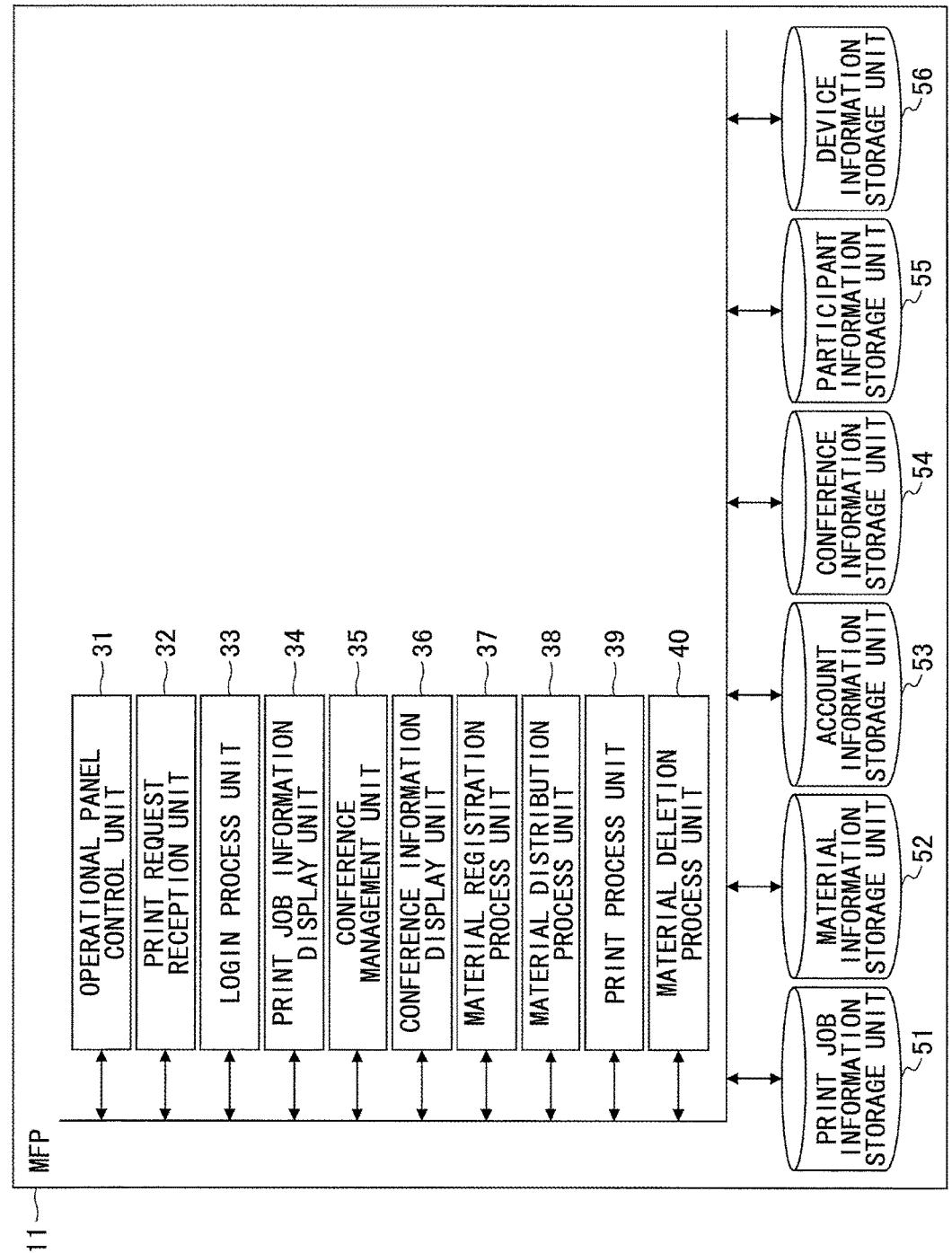
FIG. 5 is a functional block diagram of an example of a multifunction peripheral.

The MFP 11 is implemented by functional blocks, for example, as illustrated in FIG. 5. FIG. 5 is a functional block diagram of an example of the MFP 11.

By executing a program, the MFP 11 implements an operational panel control unit 31, a print request reception unit 32, a login process unit 33, a print job information display unit 34, a conference management unit 35, a conference information display unit 36, a material registration process unit 37, a material distribution process unit 38, a print process unit 39, and a material deletion process unit 40.

The MFP 11 also includes a print job information storage unit 51, a material information storage unit 52, an account information storage unit 53, a conference information storage unit 54, a participant information storage unit 55, and a device information storage unit 56.

The operational panel control unit 31 executes control for various screens displayed on the operational panel 202, and reception control of a user operation on the operational panel 202. The print request reception unit 32 receives a print job from the registration terminal 12, and stores the job. Also, the print request reception unit 32 registers print job information of the stored print job in the print job information storage unit 51.

The login process unit 33 executes a login process in response to receiving a login operation on the operational panel 202 from the user. The login process unit 33 may receive a login operation from the user using for example, an IC card or a terminal. The print job information display unit 34 displays the print job information of the user whose login has succeeded (the login user) on the operational panel 202.

The conference management unit 35 manages information about conferences and controls the conferences. The conference information display unit 36 displays a list of conference information on the operational panel 202. The conference information includes conference IDs and conference names to identify respective conferences. In response to receiving an operation to register a print job as a conference material from the login user, the material registration process unit 37 registers the material data included in the print job selected by the login user as a conference material in a conference selected by the login user. Also, the material registration process unit 37 registers conference material information of the registered conference material in the material information storage unit 52.

The material distribution process unit 38 executes a process for distributing the material data of the conference selected by the login user to the display terminals 13. The print process unit 39 executes a process for printing the material data of the conference selected by the login user. Also, the material deletion process unit 40 executes a process for deleting the material data stored in the MFP 11, following a delete operation of the material data by the login user.

The print job information storage unit 51 stores the print job information. The material information storage unit 52 stores the conference material information. For example, by recording the save destination of the material data in the conference material information, the material data may be stored in a file server apparatus other than the MFP 11.

The account information storage unit 53 stores account information about users who have permission for login on the MFP 11 (the user ID, the password, etc.). The conference information storage unit 54 stores the conference information. The participant information storage unit 55 stores participant information of participants who participate in the conference. The device information storage unit 56 stores device information of the display terminal 13.

In this way, the MFP 11 in the embodiment stores the print job received from the registration terminal 12 for the moment. Then, in response to receiving an operation for printing the stored print job from the login user, the MFP 11 executes the print job. Also, in response to receiving an operation for registering the print job as the material data of the conference from the login user, the MFP 11 registers the material data included in the print job as the material data of the conference, as will be described later.

<<Display Terminal>>

Figure 6:
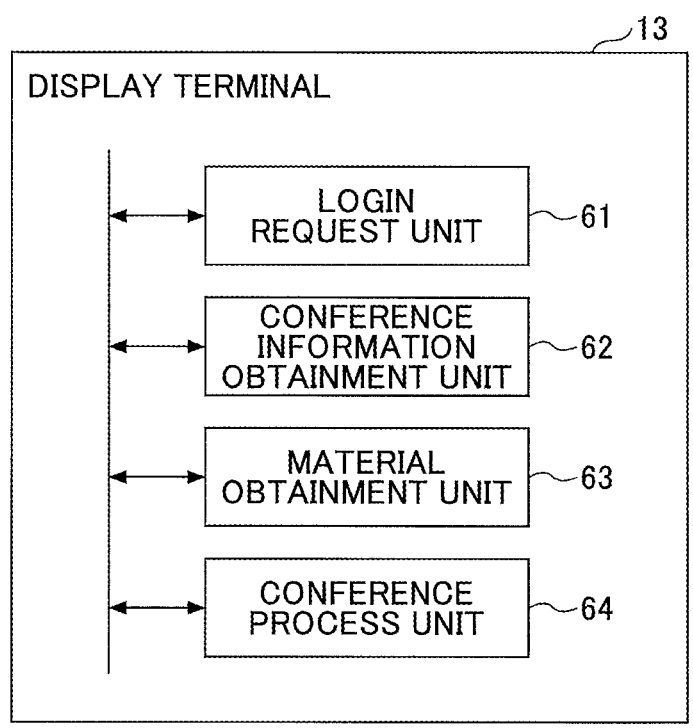
FIG. 6 is a functional block diagram of an example of a display terminal.

The display terminal 13 is implemented by functional blocks, for example, illustrated in FIG. 6. FIG. 6 is a functional block diagram of an example of the display terminal 13. By executing a program, the display terminal 13 implements a login request unit 61, a conference information obtainment unit 62, a material obtainment unit 63, and a conference process unit 64. The program executed on the display terminal 13 is, for example, an application that is installed on the display terminal 13.

The login request unit 61 makes a request for login to the MFP 11. The conference information obtainment unit 62 obtains from the MFP 11 conference information about candidates of the conference in which the login user participates, and displays a list of conference information on the display unit 102. In response to receiving an operation for selecting electronic distribution of the material data from the login user, the material obtainment unit 63 obtains the material data from the MFP 11.

In response to receiving a request for participating in a conference included in the list of conference information from the login user who is a presenter or a participant, the conference process unit 64 makes a request for participating in the conference to the MFP 11, and participates in the conference. The conference process unit 64 receives from the MFP 11 necessary information for sharing the display screen with, for example, the display terminal 13 of a presenter. For example, the conference process unit 64 updates the display screen, based on input operation information of the presenter that is distributed from the MFP 11, to share the display screen.

<Data Configuration>
<<Conference Information>>

FIG. 7 is a configuration diagram of an example of conference information. The conference information illustrated in FIG. 7 stores a conference ID, a conference name, starting date and time, a place, a participant list, and the like, which are associated with each other. The conference ID is an example of identification information to uniquely identify a conference. The conference name is the name of the conference. Starting date and time are the date and time when the conference starts. The place is identification information of a place where the conference is held. The participant list is a list of participant IDs of presenters and participants who participate in the conference.

<<Participant Information>>

FIG. 8 is a configuration diagram of an example of participant information. The participant information illustrated in FIG. 8 stores a participant ID, a participant name, a device ID, and the like, which are associated with each other. The participant ID is an example of identification information to uniquely identify a presenter or a participant who participates in the conference. The participant name is the name of the presenter or the participant. The device ID is an example of identification information to uniquely identify a display terminal 13 used by the presenter or the participant.

<<Device Information>>

FIG. 9 is a configuration diagram of an example of device information. The device information in FIG. 9 stores a device ID, an IP address, a distribution destination, and the like, which are associated with each other. The device ID is an example of identification information to uniquely identify a display terminal 13. The IP address is an example of address information of the display terminal 13 identified by the device ID. The distribution destination represents a distribution destination (a stored place) of the material data of the display terminal 13 identified by the device ID.

<<Conference Material Information>>

FIG. 10 is a configuration diagram of an example of conference material information. The conference material information illustrated in FIG. 10 stores a conference material ID, a conference ID, a stored place, a participant list, a reception state, and the like, which are associated with each other.

The conference material ID is an example of identification information to uniquely identify material data of a conference. The conference ID is an example of identification information to uniquely identify a conference. The stored place represents a stored place where the material data is stored. The participant list is a list of participant IDs of presenters and participants who participate in the conference identified by the conference ID.

The reception state represents whether the material data has been received via electronic distribution or printing ("Done"), or not received ("Not yet"), for each of the participant IDs included in the participant list.

<Details of Processes>

In the following, details of processes by the conference system 1 according to the first embodiment will be described. Here, it is assumed in the following description that the conference information in FIG. 7, the participant information in FIG. 8, and the device information in FIG. 9 have been registered.

<<Uploading Conference Material>>

Figure 11:
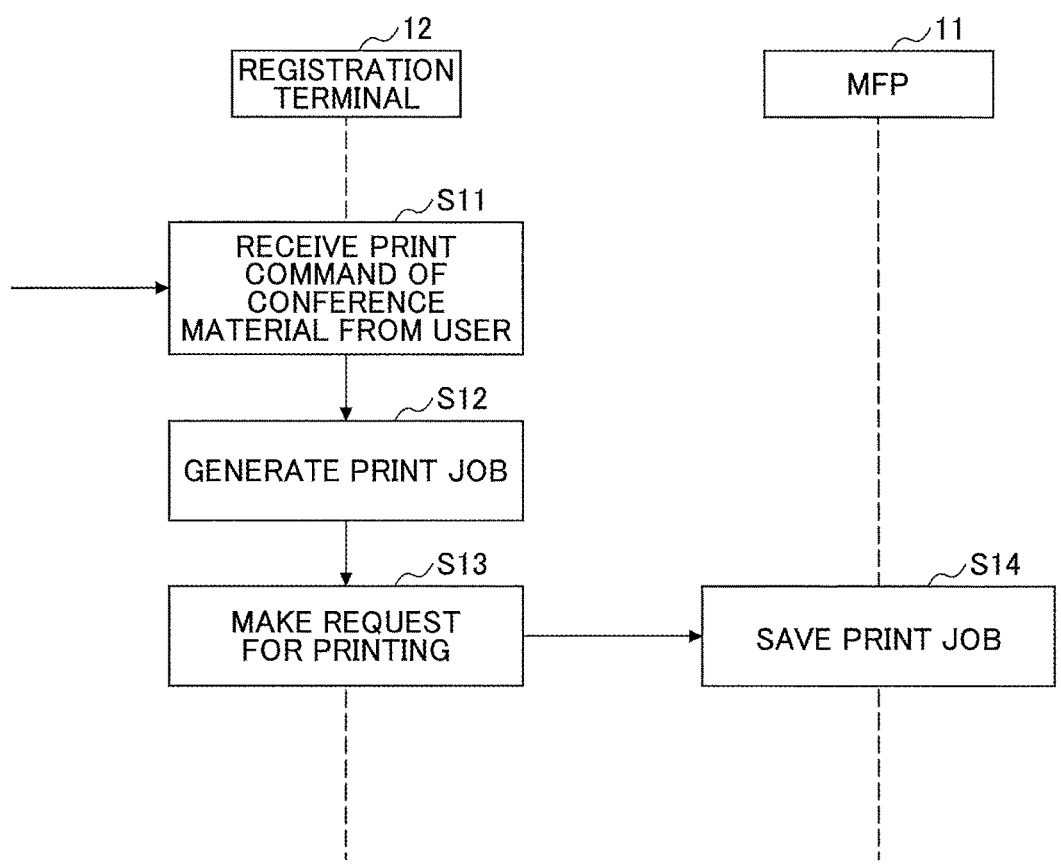
FIG. 11 is a flowchart of an example of an upload process of a conference material.

FIG. 11 is a flowchart of an example of an upload process of a conference material. For example, a registered person such as an organizer and a presenter of a conference operates the registration terminal 12 for selecting a printer driver of the MFP 11, to issue a print command of the material data of the conference.

At Step S11, the operational reception unit 22 of the registration terminal 12 receives a print command of the material data from a registered person. At Step S12, the job generation unit 24 generates a print job from the material data. The generated print job includes the material data converted into a format such as a PDF (Portable Document Format) document. Note that the format is not limited to the PDF document, but may be another format of an electronic document or an image.

At Step S13, the print request unit 23 transmits the generated print job to the MFP 11, to issue a request for printing to the MFP 11. At Step S14, in response to receiving the request for printing from the registration terminal 12, the print request reception unit 32 of the MFP 11 stores the print job received from the registration terminal 12. Also, the print request reception unit 32 stores print job information having the stored print job associated with the registered person in the print job information storage unit 51.

By the process of the flowchart illustrated in FIG. 11, the registered person can upload the print job that includes the material data of the conference to the MFP 11, by virtually the same steps as in a case of printing the material data on paper or the like.

<<Conference Registration Process of Conference Material>>

Figure 12:
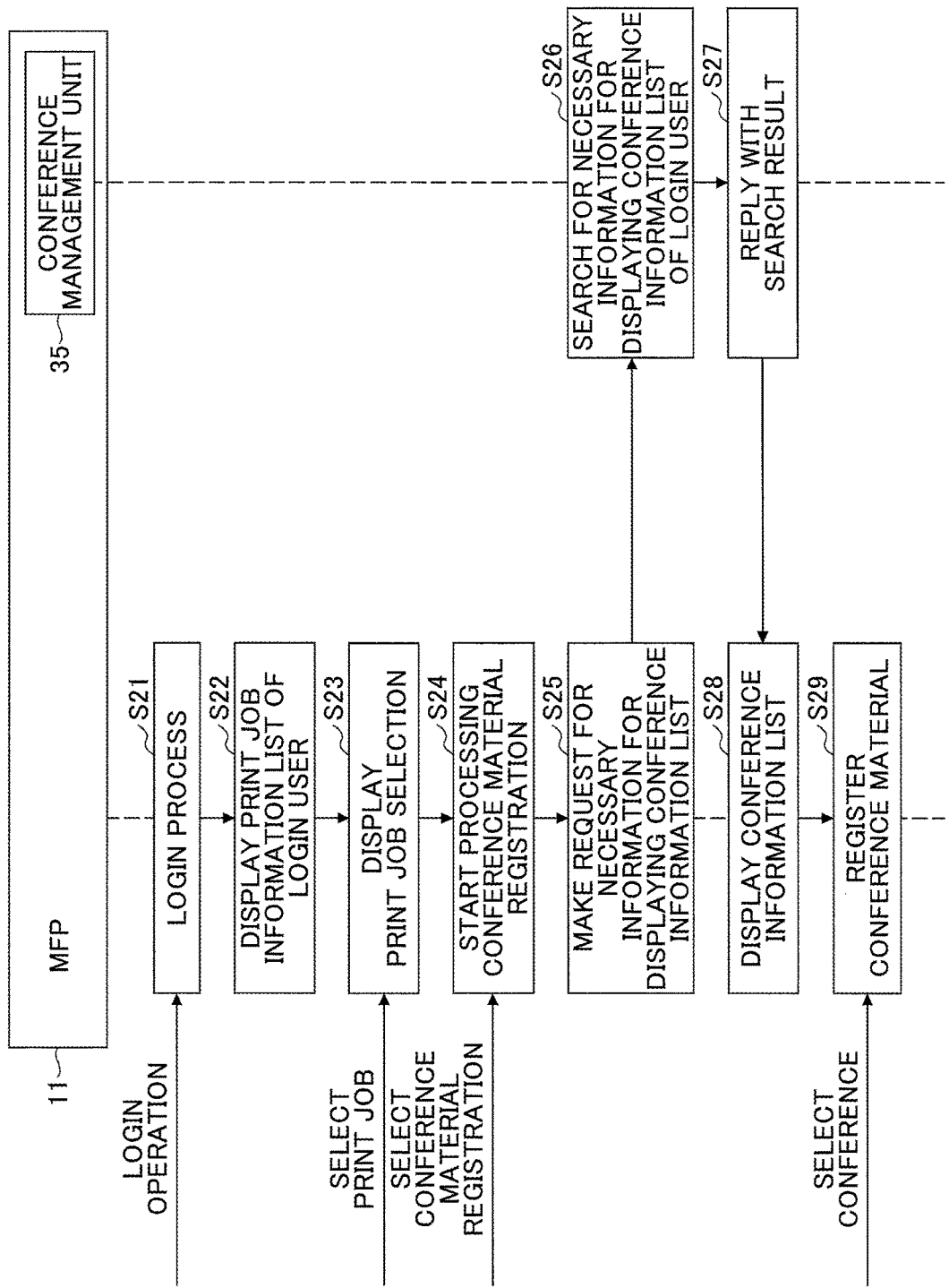
FIG. 12 is a flowchart of an example of a conference registration process of a conference material.

FIG. 12 is a flowchart of an example of a conference registration process of a conference material. For example, the registered person executes a login operation on the MFP 11. At Step S21, the login process unit 33 of the MFP 11 receives a login operation from the registered person entering the user ID and the password, or a login operation using an IC card, to execute a process for the login.

Figure 13:
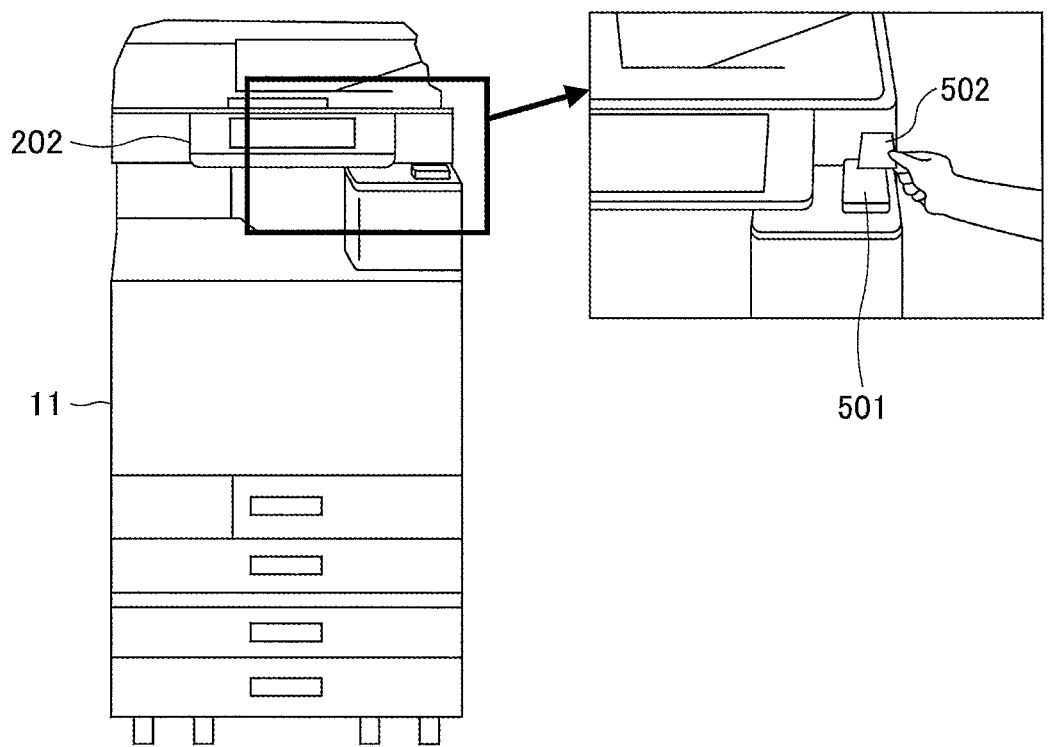
FIG. 13 is a schematic view illustrating an example of a login operation using an IC card.

The login operation by entering the user ID and the password is, for example, an authentication process in which the registered person enters the user ID and the password on the operational panel 202. The login operation using an IC card is performed, for example, as illustrated in FIG. 13. FIG. 13 is a schematic view illustrating an example of a login operation using an IC card.

For example, the registered person holds an IC card 502, which has been registered for the user, over an IC card reader 501 of the MFP 11, to perform a login operation. The login operation using the IC card 502 is an authentication process by reading the card ID from the IC card 502. Note that the card ID may be the user ID itself, or may be identification information to identify the user ID. If the card ID is identification information to identify the user ID, the login process unit 33 searches in a database that stores user IDs associated with respective card IDs, to obtain the user ID. The database may be installed in the MFP 11, or may be on a network external to the MFP 11. The IC card does not need to have a shape of a card, but may have another shape. For example, it may be a terminal such as a mobile terminal and a wearable terminal having identification information corresponding to the card ID. In this case, by using the MFP 11 and the terminal that have a communication function, for example, near field communication, installed, necessary information for a login operation can be exchanged.

Figure 14:
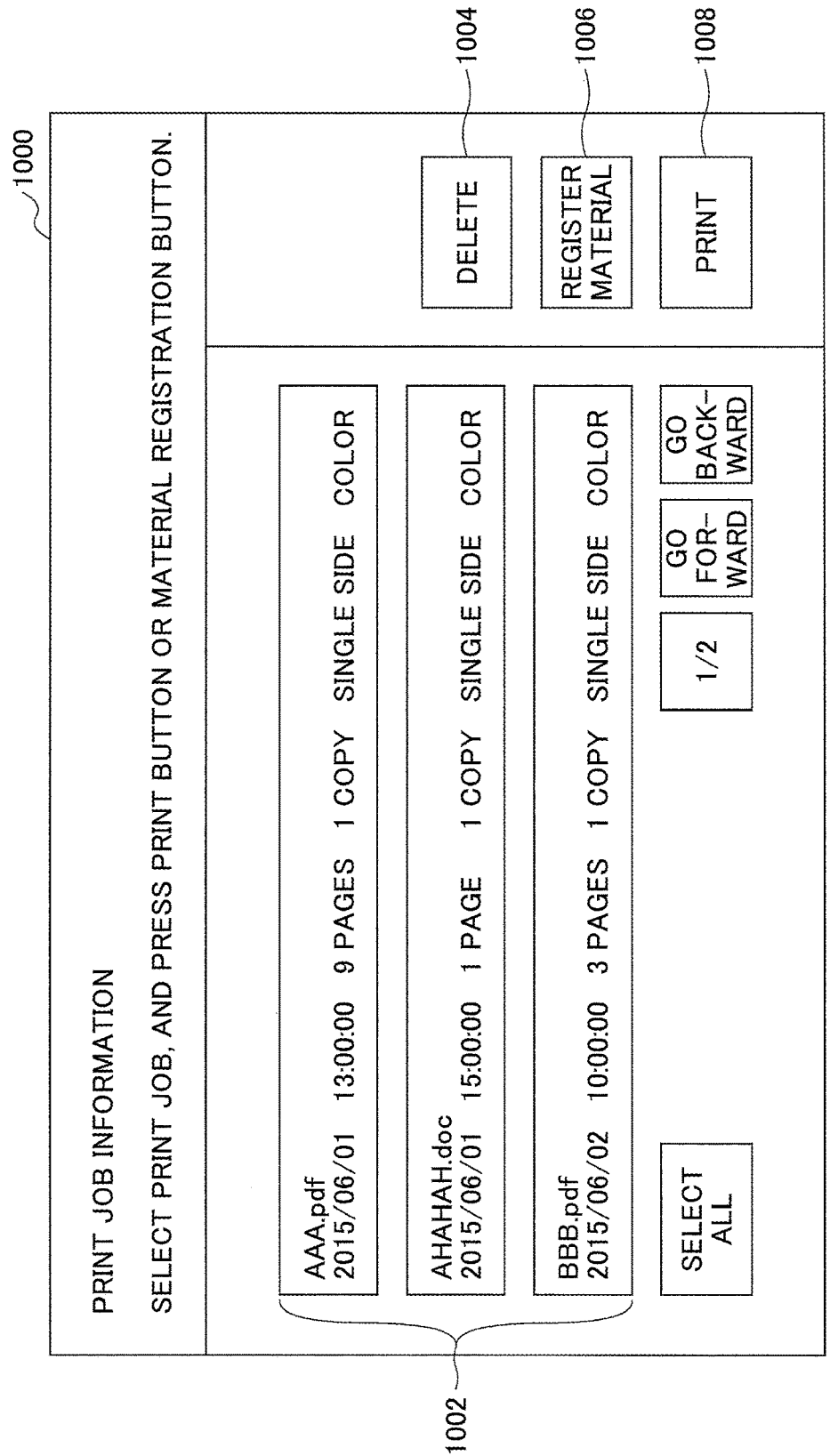
FIG. 14 is a schematic view of an example of a print job information display screen.

Going forward to Step S22, the print job information display unit 34 of the MFP 11 displays information about print jobs having been associated with the login user who has succeeded in the login on the operational panel 202, for example, as illustrated in FIG. 14.

FIG. 14 is a schematic view of an example of a print job information display screen 1000. The print job information display screen 1000 in FIG. 14 includes print job information 1002, a "delete" button 1004, a "register material" button 1006, and a "print" button 1008.

The print job information 1002 is information about print jobs uploaded from the registration terminal 12 by the login user. The login user can select a print job in the print job information 1002, and by pressing one of the "delete" button 1004, the "register material" button 1006, and the "print" button 1008, can execute one of deleting, material registering, and printing the selected print job.

At Step S23, the print job information display unit 34 receives an operation for selecting a print job from the login user. The print job information display unit 34 displays the print job selected by the login user differently from print jobs not selected.

At Step S24, the material registration process unit 37 receives a pressing operation on the "register material" button 1006 from the login user. The material registration process unit 37 starts a material registration process for the print job selected by the login user.

At Step S25, the conference information display unit 36 makes a request for necessary information for displaying a list of conference information to the conference management unit 35. At Step S26, the conference management unit 35 searches for necessary information for displaying the list of conference information of the login user. For example, the conference management unit 35 searches in the conference information storage unit 54, for conferences that includes the login user in the participant list, to read out conference information of the conferences that the login user holds or participates in. In addition to the conferences that includes the login user in the participant list, the conferences to be searched for may include conferences that do not include the login user in the participant list, and/or conferences in which an unspecified large number of users are allowed to participate if specified as such in the conference information storage unit 54, so as to be referred to as the list of conference information at the following Step S27.

At Step S27, the conference management unit 35 replies to the conference information display unit 36 with the necessary information for displaying the list of conference information of the login user as a search result. At Step S28 the conference information display unit 36 displays a conference information list screen 1300 of the login user, for example, as illustrated in FIG. 15.

Figure 15:
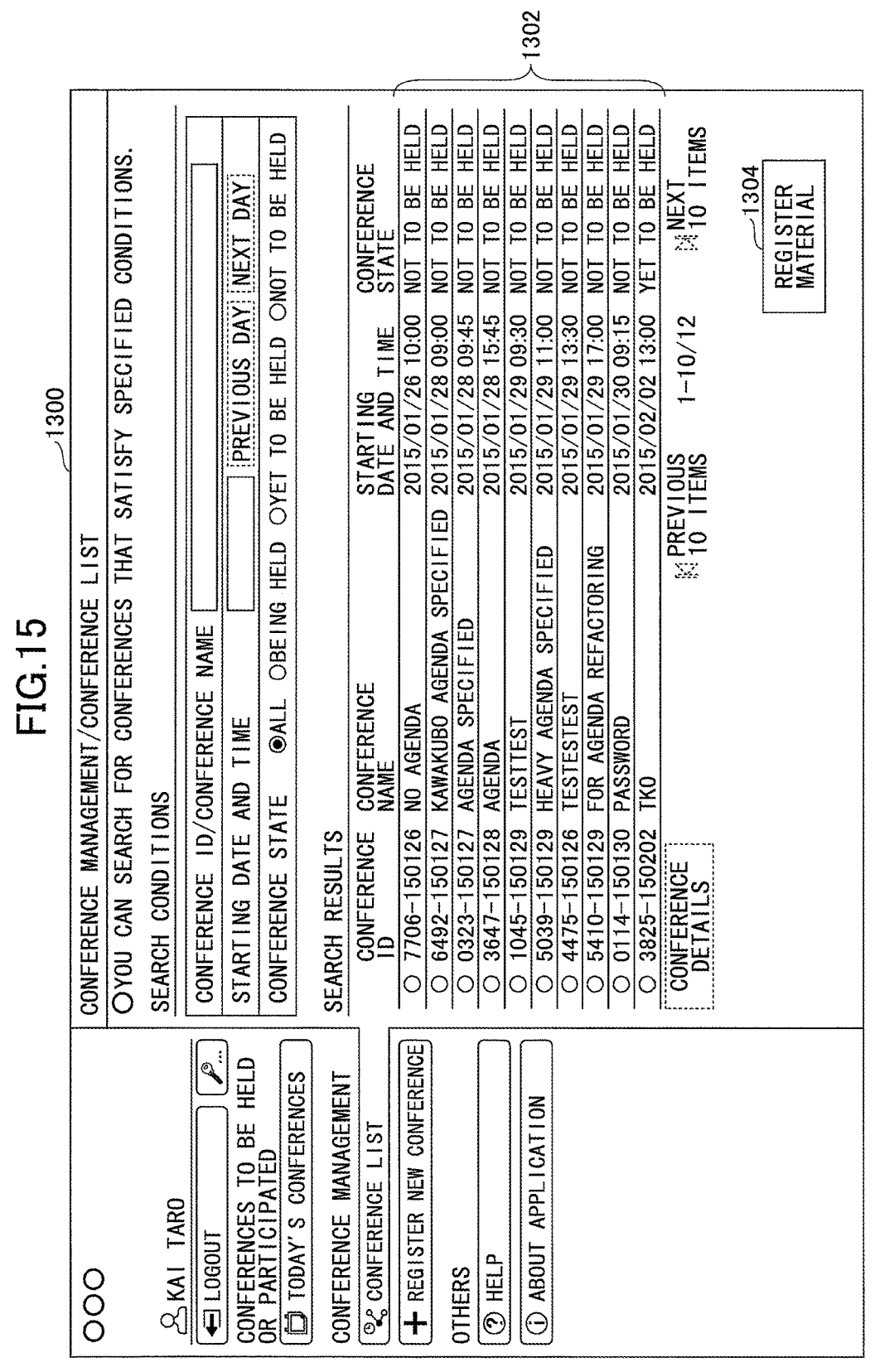

FIG. 15 is a schematic view of an example of a conference information list screen 1300 of the login user. The conference information list screen 1300 in FIG. 15 displays a conference information list 1302 including candidates of conferences that the login user holds or participates in. Also, the conference information list screen 1300 in FIG. 15 includes a "register material" button 1304.

The login user can select a conference in the conference information list 1302, and by pressing the "register material" button 1304, can register the material data of the conference included in the print job selected at Step S23, in the conference selected by the login user. In this case, the material registration process unit 37 stores at Step S29 the conference material information as illustrated in FIG. 10 as information about the conference material registered in the conference in the material information storage unit 52.

By the process of the flowchart in FIG. 12, the registered person can register the material data of the conference uploaded to the MFP 11, as the conference material of the conference selected in the conference information list 1302 that the registered person holds or participates in. Note that by newly uploading a material of the conference in the conference having another material of the conference registered already, the MFP 11 may automatically overwrite and store the new material of the conference, over the other material of the conference already registered in the conference.

<<Electronic Distribution Process of Conference Material>>

FIG. 16 is a flowchart of an example of an electronic distribution process of a conference material. For example, a presenter or a participant of the conference executes a login operation on the display terminal 13. At Step S41, the login request unit 61 of the display terminal 13 receives the login operation from the presenter or the participant of the conference, and makes a request for login to the MFP 11.

At Step S42, based on the request for login from the display terminal 13, the login process unit 33 of the MFP 11 executes a login process. If the login succeeds, the conference information display unit 36 of the MFP 11 makes a request for necessary information for displaying a list of conference information of the login user to the conference management unit 35 at Step S43.

At Step S44, the conference management unit 35 searches for necessary information for displaying the list of conference information of the login user. At Step S45, the conference management unit 35 replies to the conference information display unit 36 with the necessary information for displaying the list of conference information of the login user as a search result. At Step S46, the conference information display unit 36 transmits the necessary information for displaying the list of conference information of the login user to the display terminal 13.

At Step S47, the conference information obtainment unit 62 of the display terminal 13 receives necessary information for displaying the list of conference information of the login user from the MFP 11, and displays a conference information list screen 1300a of the login user, for example, as illustrated in FIG. 17.

FIG. 17 is a schematic view of the conference information list screen 1300a of the login user. The conference information list screen 1300a in FIG. 17 displays a conference information list 1302 including candidates of conferences that the login user holds or participates in. Also, the conference information list screen 1300a in FIG. 17 includes a "distribute material" button 1306, a "print material" button 1308, and, a "delete material" button 1310.

The login user can select a conference in the conference information list 1302, and by pressing the "distribute material" button 1306, can issue a command of electronic distribution of the material data registered in the selected conference.

At Step S48, the material obtainment unit 63 receives the command of electronic distribution of the material data of the selected conference. The material obtainment unit 63 makes a request for electronic distribution of the material data of the conference selected by the login user, to the MFP 11. At Step S49, the material distribution process unit 38 of the MFP 11 searches in the material information storage unit 52 for the material data of the conference selected by the login user.

At Step S50, the material distribution process unit 38 of the MFP 11 transmits the material data of the conference selected by the login user to the display terminal 13. At Step S51, the material obtainment unit 63 of the display terminal 13 receives the material data of the conference selected by the login user. After having received the material data of the conference, the conference process unit 64 can display the received material data.

By the process of the flowchart in FIG. 16, the login user can receive electronic distribution of the material data of the conference that the login user participates in as a presenter or a participant of the conference.

<<Print Process of Conference Material>>

Figure 18:
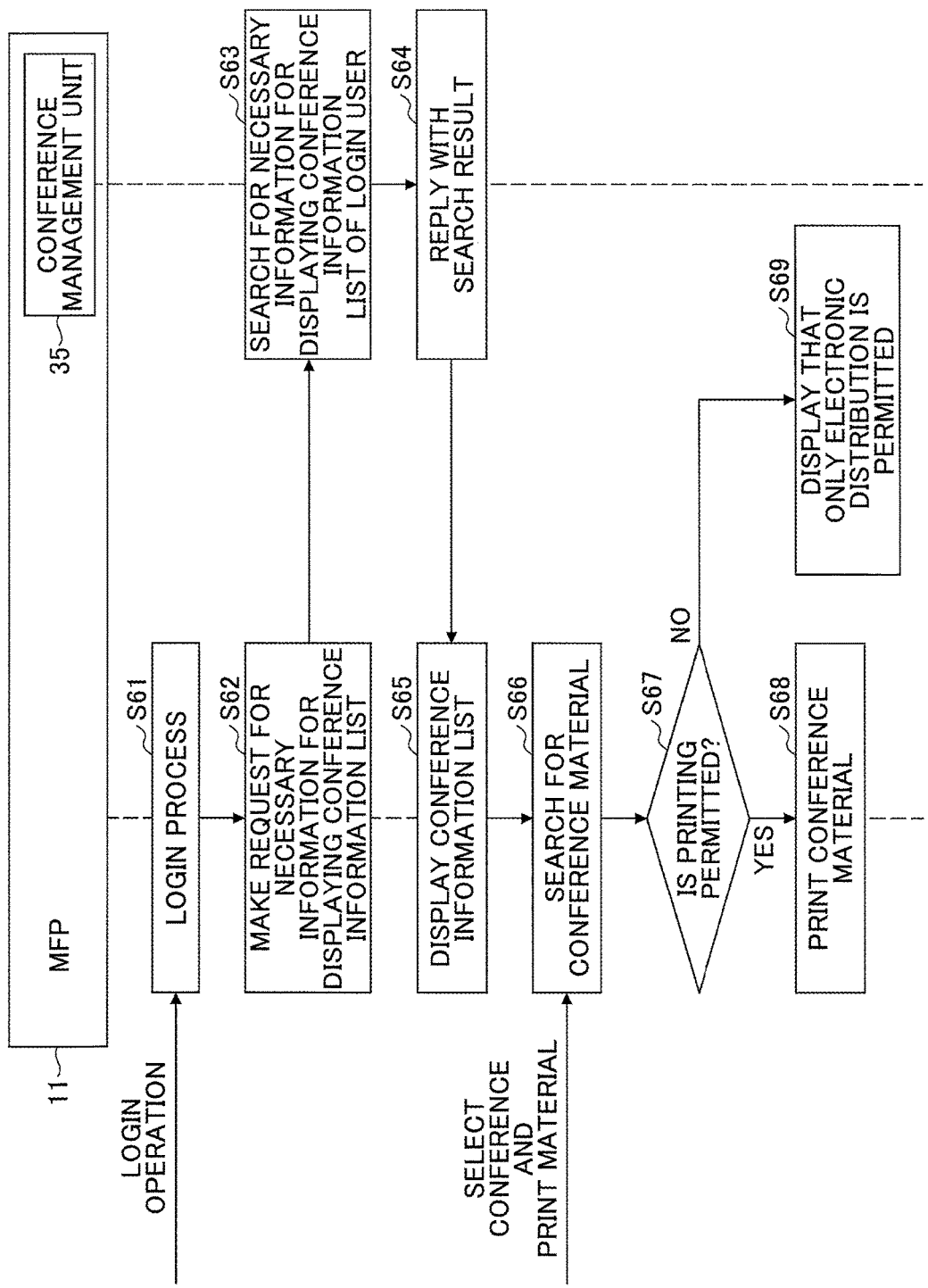
FIG. 18 is a flowchart of an example of a print process of a conference material.

FIG. 18 is a flowchart of an example of a print process of a conference material. For example, a presenter or a participant of the conference executes a login operation on the MFP 11. At Step S61, the login process unit 33 of the MFP 11 receives a login operation by entering the user ID and the password from a presenter or a participant of the conference, or a login operation using an IC card, to execute a login process.

If the login succeeds, the conference information display unit 36 of the MFP 11 makes a request for necessary information for displaying a list of conference information of the login user to the conference management unit 35 at Step S62. At Step S63, the conference management unit 35 searches for necessary information for displaying the list of conference information of the login user. At Step S64, the conference management unit 35 replies to the conference information display unit 36 with the necessary information for displaying the conference information list of the login user as a search result.

At Step S65, the conference information display unit 36 of the MFP 11 receives necessary information for displaying the list of conference information of the login user from the conference management unit 35, and displays a conference information list screen 1300a of the login user, for example, as illustrated in FIG. 17.

The login user can select a conference in the conference information list 1302, and by pressing the "print material" button 1308, can issue a command of printing the material data registered in the selected conference. At Step S66, the print process unit 39 searches in the material information storage unit 52 for the material data of the conference selected by the login user.

At Step S67, the print process unit 39 determines whether printing is permitted for the material data of the conference searched in the material information storage unit 52. For example, determination about whether printing is permitted can be determined by the security level of the conference or the conference material. Note that the security level of a conference may be registered, for example, in the conference information in FIG. 7. Also, the security level of a conference material may be selected by the registered person, for example, in the conference registration process of the conference material, to be registered in the conference material information in FIG. 10.

If the printing is permitted, the print process unit 39 of the MFP 11 executes a process for printing the material data of the conference selected by the login user at Step S68. If the printing is not permitted, the print process unit 39 of the MFP 11 displays that only electronic distribution is permitted for the material data of the conference (or printing is not permitted for the material data of the conference), for example, on the operational panel 202.

By the process of the flowchart in FIG. 18, the login user can print on the MFP 11 the material data of the conference that the login user participates in as a presenter or a participant of the conference.

<<Delete Process of Conference Material>>

Figure 19:
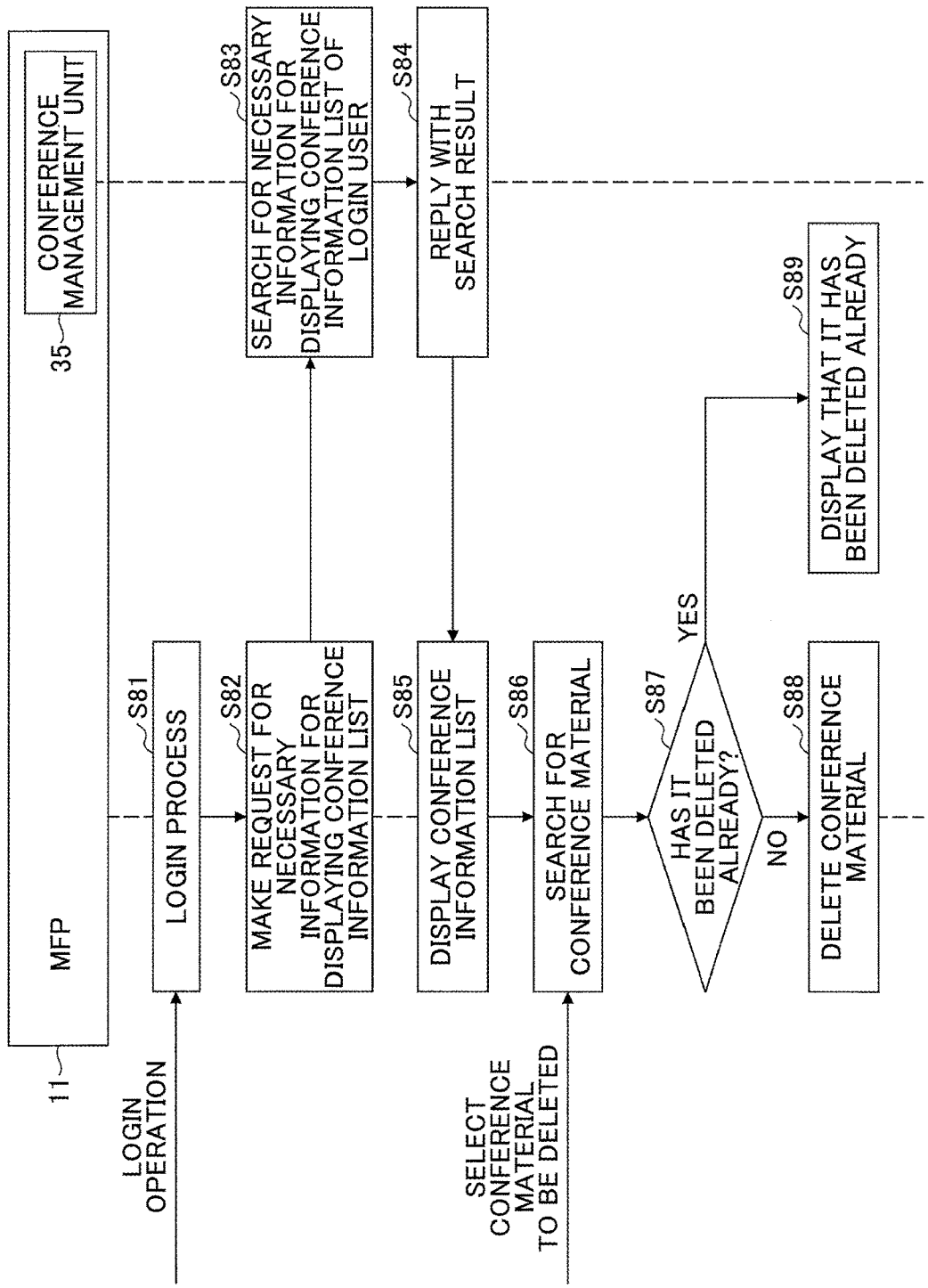
FIG. 19 is a flowchart of an example of a delete process of a conference material.

FIG. 19 is a flowchart of an example of a delete process of a conference material. Note that Steps S81 to S85 in FIG. 19 are the same as Steps S61 to S65 in FIG. 18.

The login user can select a conference in the conference information list 1302 on the conference information list screen 1300a, and by pressing the "delete material" button 1310, can issue a command of deleting the material data registered in the selected conference. At Step S86, the material deletion process unit 40 searches in the material information storage unit 52 for the material data of the conference selected by the login user.

At Step S87, the material deletion process unit 40 determines whether the material data of the conference selected by the login user has been deleted. For example, determination about whether the material data of the conference has been deleted can be determined by whether conference material information of the material data of the conference selected by the login user is stored in the material information storage unit 52.

If not having been deleted, the material deletion process unit 40 of the MFP 11 executes a process for deleting the material data of the conference selected by the login user at Step S88. Note that if having been deleted, the material deletion process unit 40 of the MFP 11 displays at Step S89 that the material data of the conference has been deleted, for example, on the operational panel 202.

By the process of the flowchart in FIG. 19, the login user can delete the material data of the conference that the login user participates in as a presenter or a participant of the conference from the MFP 11. Note that the login user who can delete the material data of the conference from the MFP 11 may be limited to a registered person who has registered the material data.

Figure 20:
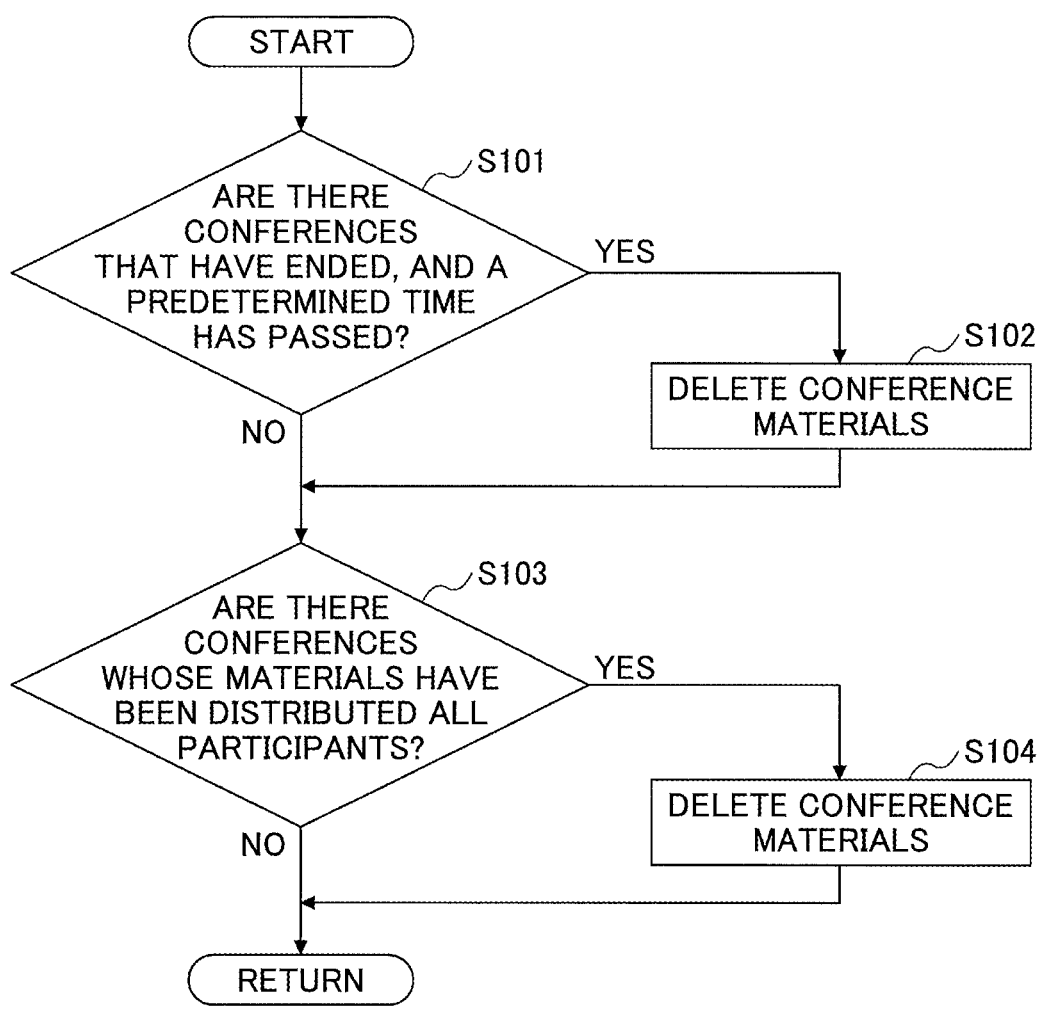
FIG. 20 is a flowchart of an example of an automatic delete process of a conference material.

Also, the MFP 11 may automatically delete the material data of the conference from the MFP 11, for example, by steps as illustrated in FIG. 20. FIG. 20 is a flowchart of an example of an automatic delete process of a conference material.

At Step S101, the material deletion process unit 40 refers to the conference information stored in the conference information storage unit 54, to search for a conference for which a predetermined time has passed since the ending date and time of the conference. If there is a conference for which the predetermined time has passed since the ending date and time, the material deletion process unit 40 deletes the conference material of the conference for which the predetermined time has passed since the ending date and time, at Step S102.

Also, at Step S103, the material deletion process unit 40 refers to the participant list and the reception state of the conference material information in FIG. 10 stored in the material information storage unit 52, to search for a conference in which the reception state of every participant in the participant list has been set to "Done". If there is a conference in which the reception state of every participant in the participant list has been set to "Done", the material deletion process unit 40 deletes the conference material of the conference in which the reception state of every participant in the participant list has been set to "Done", at Step S104.

By the process of the flowchart in FIG. 20, the MFP 11 can automatically delete the material data of the conference registered in the conference.

<<Another System Configuration>>

Figure 21:
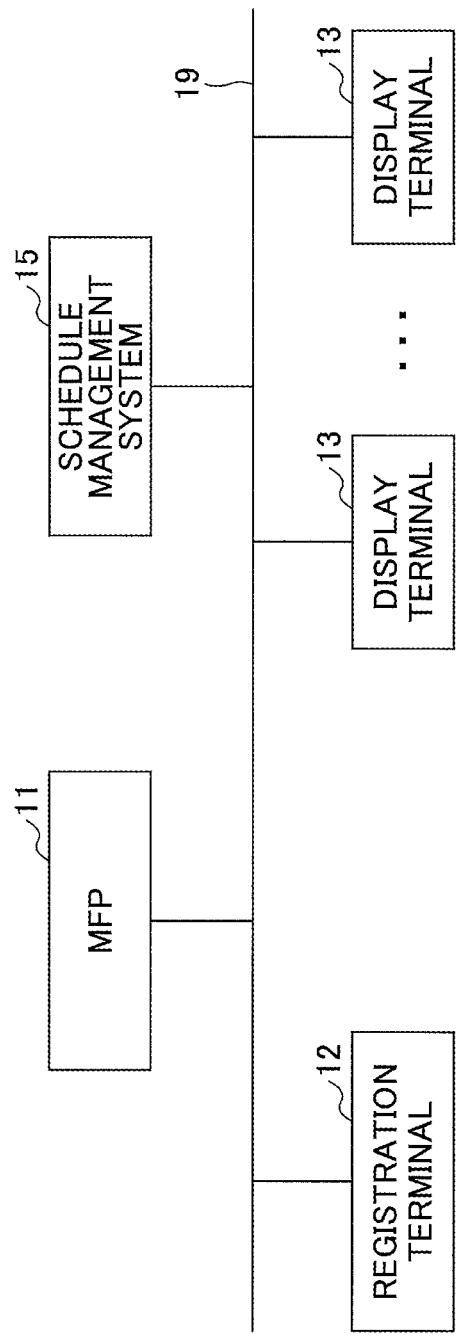
FIG. 21 is a configuration diagram of another example of a conference system according to the first embodiment.

FIG. 21 is another configuration diagram of a conference system 1*a* according to the first embodiment. The conference system 1*a* in FIG. 21 is configured to have a schedule management system 15 added to the configuration of the conference system 1 in FIG. 1. The schedule management system 15 is an example of a system to manage schedules, for example, of employees in a company. Thereupon, in the conference system 1*a* in FIG. 21, conference information registered in the MFP 11 is reflected on schedules managed by the schedule management system 15.

Also, when an organizer of a conference registers a conference by using the conference management unit 35 of the MFP 11, the conference system 1*a* in FIG. 21 may use the schedules of employees managed by the schedule management system 15. In this way, the conference system 1*a* according to the first embodiment may have the conference management unit 35 of the MFP 11 and the schedule management system 15 cooperate.

<Summary>

In the conference system 1 according to the first embodiment, the material data of the conference is uploaded from the registration terminal 12 to the MFP 11, by using a mechanism in authenticated printing for uploading a print job to the MFP 11. In addition, in the conference system 1 according to the first embodiment, a registered person can register the material data uploaded to the MFP 11 in the conference on the operational panel 202 of the MFP 11.

Therefore, by using the conference system 1 according to the first embodiment, a registered person can easily register material data of a conference to be obtained by multiple display terminals 13, by operating the registration terminal 12 and the MFP 11.

Second Embodiment

The conference system 1 in the first embodiment has the MFP 11 including the conference management function. The second embodiment is an example of a configuration in which the conference management function provided in the MFP 11 in the first embodiment is included in a device other than the MFP 11. Note that the second embodiment is substantially the same as the first embodiment except for some parts, and their description is omitted appropriately.

Figure 22:
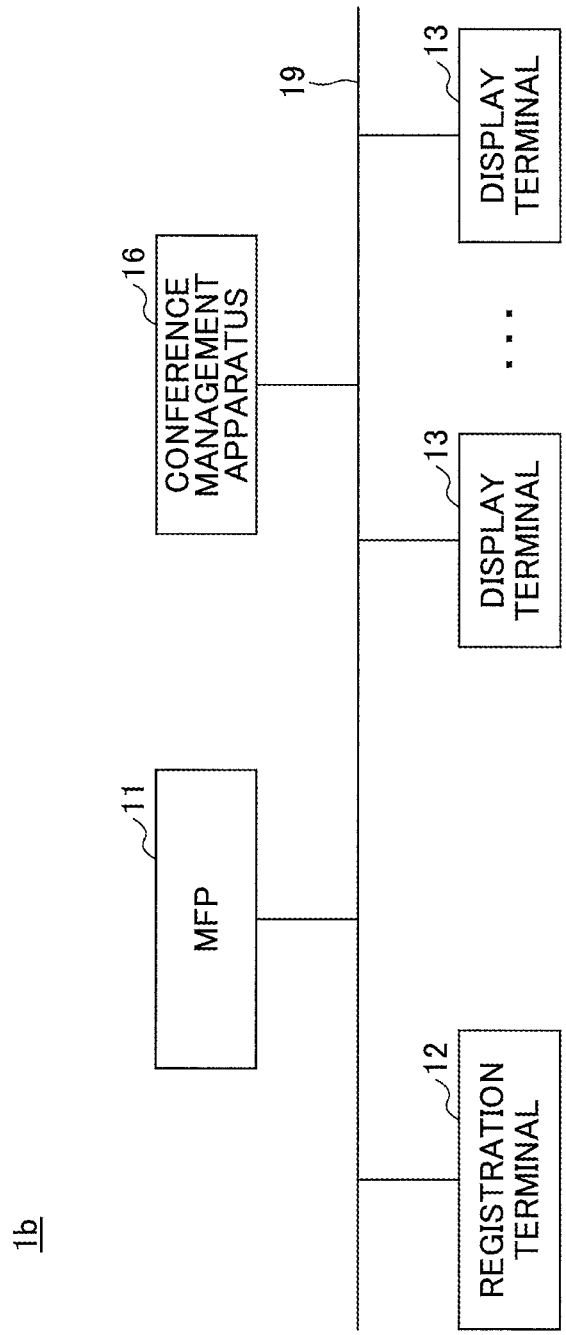
FIG. 22 is a configuration diagram of an example of a conference system according to a second embodiment.

FIG. 22 is a configuration diagram of an example of a conference system 1*b* according to the second embodiment. The conference system 1*b* in FIG. 22 has a conference management apparatus 16 having a conference management function added to the configuration of the conference system 1 in FIG. 1. The conference management apparatus 16 receives a request for generating a conference session, and stores the conference information and the like described above. Further, the conference management apparatus 16 executes control for holding a conference, and control for participating in a conference.

Figure 23:
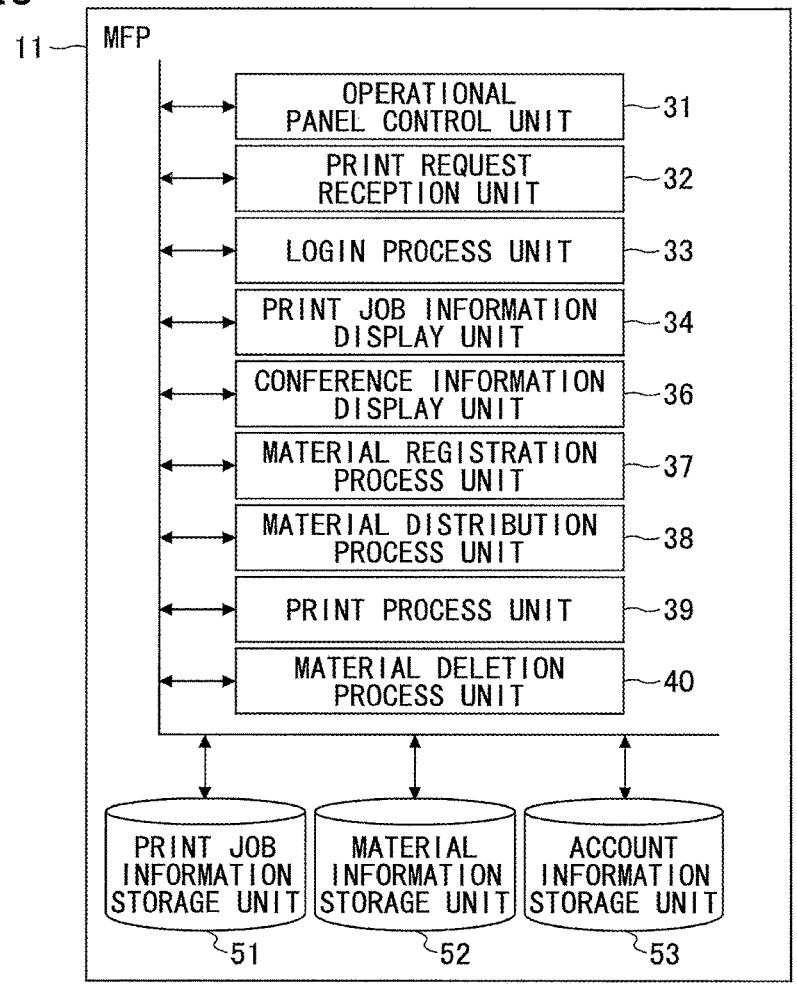
FIG. 23 is a functional block diagram of another example of a multifunction peripheral.

In the second embodiment, the MFP 11 is implemented by functional blocks illustrated in FIG. 23. FIG. 23 is a functional block diagram of another example of the MFP 11. The MFP 11 in FIG. 23 has a configuration in which the conference management unit 35, the conference information storage unit 54, the participant information storage unit 55, and the device information storage unit 56 in the configuration of the MFP 11 in FIG. 1, are removed. The elements removed from the MFP 11 in FIG. 1 are disposed in the conference management apparatus 16 as illustrated in FIG. 24.

Figure 24:
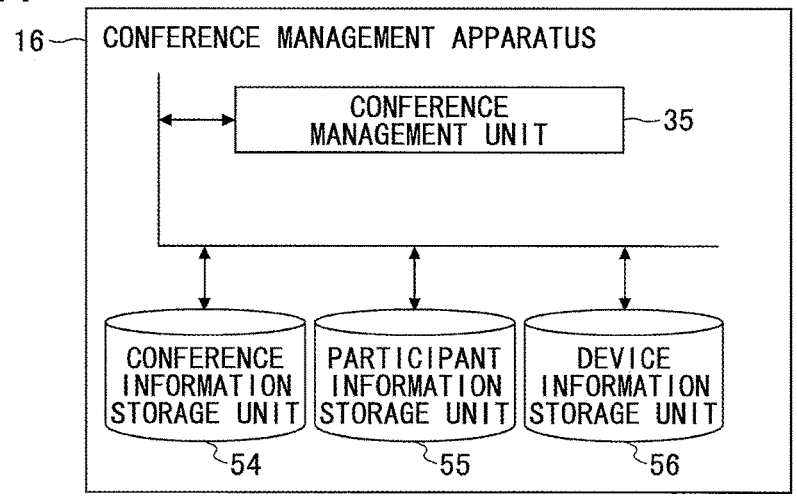
FIG. 24 is a functional block diagram of an example of a conference management apparatus.

FIG. 24 is a functional block diagram of an example of the conference management apparatus 16. By executing a program, the conference management apparatus 16 implements the conference management unit 35, the conference information storage unit 54, the participant information storage unit 55, and the device information storage unit 56. Note that processes of the conference system 1*b* in the second embodiment can be obtained by replacing the conference management unit 35 in the flowcharts in FIG. 12, FIG. 16, FIG. 18, and in FIG. 19, with the conference management apparatus 16 provided external to the MFP 11.

By using the conference system 1*b* according to the second embodiment, the same effects can be obtained as in the conference system 1 according to the first embodiment, by having the MFP 11 and the conference management apparatus 16 cooperate.

Third Embodiment

The conference system 1*b* in the second embodiment has the conference management apparatus 16 provided on the same the network 19 as the MFP 11, the registration terminal 12, and the display terminal 13. A third embodiment is an example of a configuration in which the conference management apparatus 16 in the second embodiment is provided on a network other than the network 19 such as the Internet. The network 19 is a private network, for example, an in-house LAN.

FIG. 25 is a configuration diagram of an example of a conference system 1c according to the third embodiment. The conference system 1c in FIG. 25 has a configuration in which the conference management apparatus 16, which is connected with the network 19 in the conference system 1b in FIG. 22, is connected with a network 20 such as the Internet. The conference management apparatus 16 of the conference system 1c in FIG. 25 may be implemented, for example, by a cloud server.

According to the conference system 1c in FIG. 25, by providing the conference management apparatus 16 on the public network 20, a user can use the conference management function from a network other than the private network 19. Also, in the conference system 1c in FIG. 25, since the conference material information and the material data are managed by the MFP 11, the security level can be maintained.

The present invention is not limited to the embodiments specifically disclosed above, but various variations and modifications may be made without departing from the scope of the present invention. For example, although the conference systems have been described in the embodiments, as examples of applications of the information processing system, the information processing system can be applied to applications such as seminars and education in which materials are to be registered. Also, a "conference" in the embodiments not only means getting together for determining something, but other forms of communication in general including classes and lectures in educational institutions, seminars, presentations, and the like. The method for distributing material data in the embodiments may be real-time streaming distribution of video data based on the material data during a conference.

Also, the registration terminal 12 and the display terminal 13 are examples of a terminal apparatus. The MFP 11 is an example of an image processing apparatus. The print job is an example of a print request. The print request reception unit 32 is an example of a processor to receive a print request. The print process unit 39 is an example of the processor to execute a print process. The material registration process unit 37 is an example of the processor to execute a registration process.

The print job information display unit 34 is an example of the processor to display print request identification information. The conference information display unit 36 is an example of the processor to display conference identification information. The operational panel control unit 31 is an example of the processor to receive selection. The material distribution process unit 38 is an example of the processor to distribute electronic data of material. Note that the conference system 1 including the MFP 11, the registration terminal 12, and the display terminal 13 is just an example, and it is needless to say that various configurations of the system are possible depending on applications and objects.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can be comprised of any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors, in other words, for example, one or more processors. If the CPU is implemented by multiple processors, a process to be executed by one of the processors may be distributed to the processors, by having the processors communicate with each other so as to execute cooperative operations. The RAM may be implemented by any desired kind of volatile memory or both volatile and non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

RELATED-ART DOCUMENTS

Patent Documents

[Patent Document 1] Japanese Unexamined Patent Application Publication No. 2015-103131

The present application claims priority under 35 U.S.C. § 119 of Japanese Patent Application No. 2015-199485 filed on Oct. 7, 2015, the entire contents of which are hereby incorporated by reference.

What is claimed is:

1. An image processing apparatus that is configured to execute a print process in response to a print request received from a terminal apparatus associated with a particular user, the image processing apparatus comprising:
   a storage storing a computer-readable code; and
   a processor configured to execute the computer-readable code to
      receive the print request from the terminal apparatus associated with the particular user, the print request including electronic data,
      display print request identification information to identify the print request that has been received from the particular user,
      display the print request identification information on a display,
      display conference identification information to identify a conference associated with the particular user, on the display, execute the print process based on the electronic data included in the print request, in response to the print request, and execute a registration process to associate the electronic data included in the print request with the conference corresponding to the conference identification information, in response to receiving a registration request from the particular user, in which the displayed print request identification information and the displayed conference identification information are selected, to enable sharing of the electronic data among a plurality of terminal apparatuses participating in the conference, based on a determination that the particular user is associated with the conference.

2. The image processing apparatus as claimed in claim 1, wherein the processor is configured to execute the computer-readable code to display the print request identification information associated with the particular user based on the particular user being authenticated.

3. The image processing apparatus as claimed in claim 1, wherein the processor is configured to execute the computer-readable code to display the conference identification information associated with the particular user based on the particular user being authenticated.

4. The image processing apparatus as claimed in claim 1, wherein the processor is configured to execute the computer-readable code to receive a selection from the particular user indicating whether to execute the print process based on the electronic data included in the print request or to execute the registration process to associate the electronic data included in the print request with the conference, and execute one of the print process or the registration process based on a result of the received selection.

5. The image processing apparatus as claimed in claim 1, wherein the processor is configured to execute the computer-readable code to, distribute the electronic data to the terminal apparatus in response to receiving a material distribution request from the terminal apparatus, the material distribution request including the selection of the conference identification information.

6. The image processing apparatus as claimed in claim 5, wherein the processor is configured to execute the computer-readable code to execute the print process in response to receiving a material print request from the particular user to print the electronic data, the material print request including the selection of the conference identification information.

7. The image processing apparatus as claimed in claim 6, wherein the processor is configured to execute the computer-readable code to execute the print process in response to receiving the material print request from the particular user, the material print request including the selection of the conference identification information, the executing the print process including determining whether printing is permitted for the electronic data, and selectively printing the electronic data based on whether the printing is permitted, the selectively printing including performing one of printing the electronic data based on a determination that the printing is permitted, or displaying a message that the printing is not permitted for the electronic data, based on a determination that the printing is not permitted.

8. The image processing apparatus as claimed in claim 5, wherein the processor is configured to execute the computer-readable code to execute a delete process to delete the electronic data in response to receiving a material delete request from the particular user, the material delete request including the selection of the conference identification information.

9. The image processing apparatus as claimed in claim 8, wherein the processor is configured to execute the computer-readable code to automatically executes the delete process of the conference identification information for which a particular period of time has passed since an end of the conference, or distribution of the electronic data to the terminal apparatus has been completed.

10. A method for registration in an image processing apparatus that is configured to execute a print process in response to a print request received from a terminal apparatus associated with a particular user, the method comprising:

receiving the print request from the terminal apparatus associated with the particular user, the print request including electronic data, displaying print request identification information to identify the print request that has been received from the particular user, displaying the print request identification information on a display, displaying conference identification information to identify a conference associated with the particular user, on the display, executing the print process based on the electronic data included in the print request, in response to the print request, and executing a registration process to associate the electronic data included in the print request with the conference corresponding to the conference identification information, in response to receiving a registration request from the particular user, in which the displayed print request identification information and the displayed conference identification information are selected, to enable sharing of the electronic data among a plurality of terminal apparatuses participating in the conference, based on a determination that the particular user is associated with the conference.

11. The method for registration as claimed in claim 10, wherein the displaying the print request identification information includes displaying the print request identification information associated with the particular user based on the particular user being authenticated.

12. The method for registration as claimed in claim 10, wherein the displaying the conference identification information includes displaying the conference identification information associated with the particular user based on the particular user being authenticated.

13. The method for registration as claimed in claim 10, the method further comprising:

receiving a selection from the particular user indicating whether to execute the print process based on the electronic data included in the print request, or to execute the registration process to associate the electronic data included in the print request with the conference, and executing one of the print process or the registration process based on a result of the received selection.

14. The method for registration as claimed in claim 10, the method further comprising:
distributing the electronic data to the terminal apparatus in response to receiving a material distribution request from the terminal apparatus, the material distribution request including the selection of the conference identification information.

15. The method for registration as claimed in claim 14, wherein the executing the print process includes executing the print process in response to receiving a material print request from the particular user to print the electronic data, the material print request including the selection of the conference identification information.

16. The method for registration as claimed in claim 15, wherein the executing the print process includes
executing the print process in response to receiving the material print request from the particular user, the material print request including the selection of the conference identification information, the executing the print process including determining whether printing is permitted for the electronic data, and,
selectively printing the electronic data based on whether the printing is permitted, the selectively printing including performing one of
printing the electronic data based on a determination that the printing is permitted, or
displaying a message that the printing is not permitted for the electronic data, based on a determination that the printing is not permitted.

17. The method for registration as claimed in claim 14, the method further comprising:
executing a delete process to delete the electronic data in response to receiving a material delete request from the particular user, the material delete request including the selection of the conference identification information.

18. An information processing system comprising:
a plurality of terminal apparatuses; and
an image processing apparatus that is configured to execute a print process in response to a print request received from a terminal apparatus of the plurality of terminal apparatuses, the terminal apparatus associated with a particular user,
wherein the image processing apparatus includes
a storage storing a computer-readable code; and
one or more processors configured to execute the computer-readable code to
receive the print request from the terminal apparatus associated with the particular user, the print request including electronic data,
display print request identification information to identify the print request that has been received from the particular user,
display the print request identification information on a display,
display conference identification information to identify a conference associated with the particular user, on the display,
execute the print process based on the electronic data included in the print request, in response to the print request, and
execute a registration process to associate the electronic data included in the print request with the conference corresponding to the conference identification information, in response to receiving a registration request from the particular user, in which the displayed print request identification information and the displayed conference identification information are selected, to enable sharing of the electronic data among a plurality of terminal apparatuses participating in the conference, based on a determination that the particular user is associated with the conference.

* * * * *